United States Patent [19]
Saeki et al.

[11] Patent Number: 5,808,444
[45] Date of Patent: Sep. 15, 1998

[54] CHARGING-AND-DISCHARGING DEVICE, BATTERY PACK AND ELECTRONIC APPARATUS INCLUDING THEM

[75] Inventors: Mituo Saeki; Hidekiyo Ozawa; Takeshi Kubo, all of Kawasaki, Japan

[73] Assignee: Fujitsu Limited, Kawasaki, Japan

[21] Appl. No.: 838,532

[22] Filed: Apr. 9, 1997

Related U.S. Application Data

[62] Division of Ser. No. 521,654, Aug. 31, 1995.

[30] Foreign Application Priority Data

Sep. 1, 1994 [JP] Japan .................................. 6-208627

[51] Int. Cl.⁶ ................................................ H01M 10/46
[52] U.S. Cl. ............................................ 320/117; 320/139
[58] Field of Search ...................... 320/6, 15, 12, 320/18, 19, 22, 30, 31, 32, 39, 116, 117, 118, 119, 124, 126, 129, 139

[56] References Cited

U.S. PATENT DOCUMENTS

| | | | |
|---|---|---|---|
| 4,433,277 | 2/1984 | Carollo et al. | 320/15 X |
| 5,218,285 | 6/1993 | Carlton et al. | 320/15 |
| 5,254,930 | 10/1993 | Daly | 320/15 |
| 5,264,777 | 11/1993 | Smead | 320/6 |

FOREIGN PATENT DOCUMENTS

| | | |
|---|---|---|
| 0069 640 A1 | 1/1983 | European Pat. Off. |
| 0 512 340A1 | 11/1992 | European Pat. Off. |
| 0 621 649A1 | 10/1994 | European Pat. Off. |
| 0662 745 A1 | 7/1995 | European Pat. Off. |
| 0 665 628A2 | 8/1995 | European Pat. Off. |
| 58-144542 | 8/1983 | Japan . |
| 61-154432 | 7/1986 | Japan . |
| 1-238437 | 9/1989 | Japan . |
| 2-19912 | 1/1990 | Japan . |
| 2-303328 | 12/1990 | Japan . |
| 4 275031 | 9/1992 | Japan . |
| 1034694 | 6/1966 | United Kingdom . |
| 1285191 | 8/1972 | United Kingdom . |
| 1 437 888 | 6/1976 | United Kingdom . |
| 2 010 607 | 6/1979 | United Kingdom . |
| 1 551 655 | 8/1979 | United Kingdom . |
| 2 156 611 | 10/1985 | United Kingdom . |
| 2 254 203 | 9/1992 | United Kingdom . |
| 2 255 243 | 10/1992 | United Kingdom . |
| 2 265 056 | 9/1993 | United Kingdom . |
| 2 279 802 | 1/1995 | United Kingdom . |
| WO93/05560 | 3/1993 | WIPO . |
| WO95/00992 | 1/1995 | WIPO . |

Primary Examiner—Edward Tso
Attorney, Agent, or Firm—Nikaido, Marmelstein, Murray & Oram LLP

[57] ABSTRACT

A charging-and-discharging device in an electronic apparatus includes a rechargeable battery and a charging device for charging the battery. The charging-and-discharging device includes a switching circuit electrically isolating one terminal side of the battery from a ground side of the electronic apparatus. The charging-and-discharging device further includes a charge control section controlling the isolating of the one terminal side of the battery from the ground side of the electronic apparatus by turning off the switching circuit during charging of the battery. In the charging-and-discharging device, the one terminal side of the battery is isolated from the ground side of the electronic apparatus by the switching circuit during charging of the battery and a closed loop including the charging device and the battery is established to charge the battery.

4 Claims, 19 Drawing Sheets

FIG.7A
PRIOR ART
FIG.7B
PRIOR ART
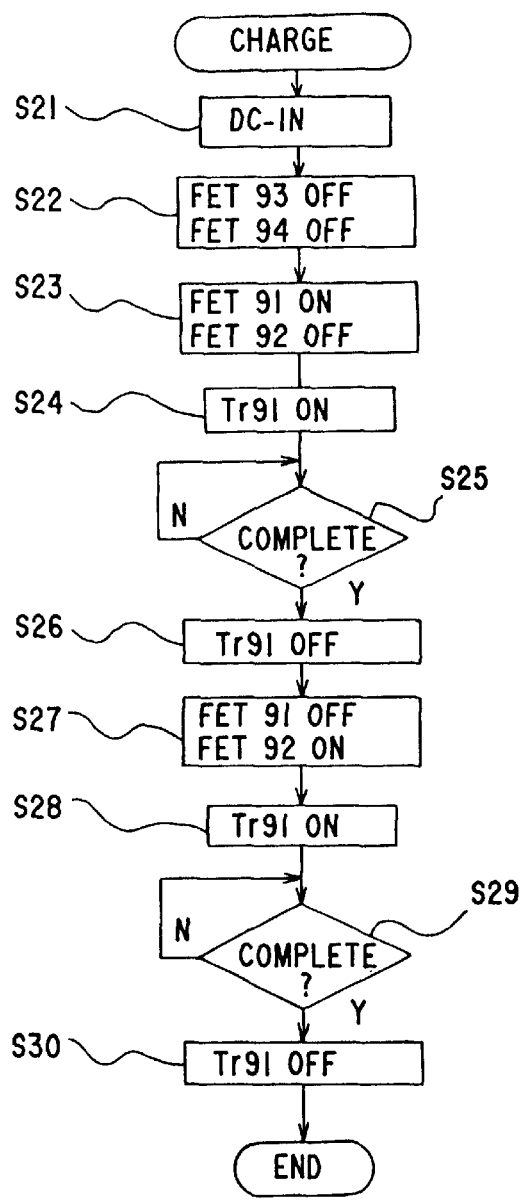
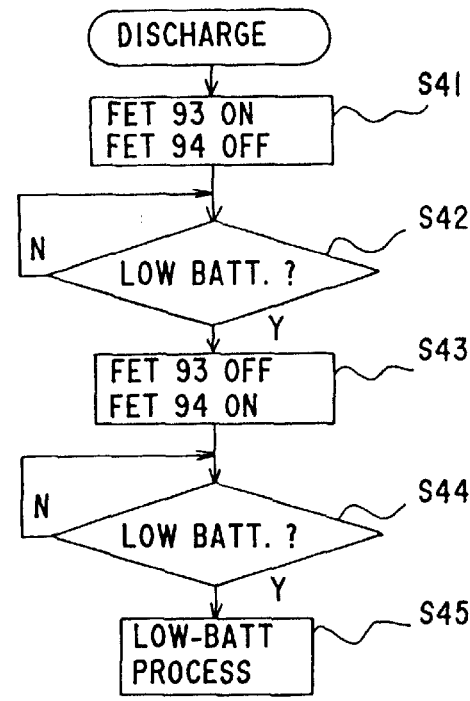

CHARGING-AND-DISCHARGING DEVICE, BATTERY PACK AND ELECTRONIC APPARATUS INCLUDING THEM

This is a division of application Ser. No. 08/521,654, filed Aug. 31, 1995.

BACKGROUND OF THE INVENTION

1. Field of the Invention

The present invention generally relates to a charging-and-discharging device and a battery pack which is used for a portable-type electronic apparatus such as a note-type personal computer.

In a portable-type electronic apparatus such as a note-type personal computer, batteries are installed as a power source for the apparatus. In general, based on the operational cost of the apparatus and current capacity which can be discharged for an instant, secondary batteries such as NiCd batteries are installed. Many apparatuses include charging circuits to charge the built-in secondary batteries by easily connecting an AC adaptor to the apparatus.

In such apparatus, charging-and-discharging control technologies that achieve a parallel charging of a plurality of batteries, reduction of a power loss in the discharging, and a highly efficient use of the battery are desired.

2. Description of the Related Art (1) Prior Art

A charging-and-discharging device having the above technologies comprises a voltage converter, an over-discharge prevention circuit, and a plural-battery-pack charging circuit. In the following, descriptions these circuits will be discussed in that order.

A. Voltage Converter

When the electronic apparatus is operated with the battery, voltage of the battery is usually decreased as the battery proceeds to discharge. Therefore, to maintain the voltage used in the electronic apparatus at a constant value, output of the battery is stabilized to the constant voltage by using a DC to DC converter. When the output of the battery is stabilized by using the DC to DC converter, there are two relationships between the voltage of the battery mounted in the electronic apparatus and the voltage used within a main body of the electronic apparatus.

One relationship is that the voltage of the battery is higher than the voltage used within the electronic apparatus. The voltage of the battery is lowered to the voltage used within the electronic apparatus by the DC to DC converter. This type of DC to DC converter is referred to a step-down-type converter.

The other relationship is that the voltage of the battery is lower than the voltage used within the electronic apparatus. The voltage of the battery is raised to the voltage used within the electronic apparatus by the DC to DC converter. This type of DC to DC converter is referred to a step-up-type converter.

In the electronic apparatus, use of the step-down-type converter and the step-up-type converter is determined according to power consumption of the apparatus, operation time of the apparatus with the secondary battery, size and weight of the apparatus, and so on.

In the following, the two types of DC to DC converters will be described.

[Step-down-type Converter]

FIG. 1 shows a schematic diagram of a conventional charging-and-discharging device with a built-in charging device and the step-down-type converter. The device shown in FIG. 1 comprises a DC to DC converter 500, a charging control section 510 for controlling the charging, a DC connector 520 for connecting with the AC adaptor, etc., and a constant current circuit 530 for charging which constructs the charging device. The DC to DC converter 500 includes a DC to DC control section 501. The constant current circuit 530 includes a constant current control section 531. Numeral 540 indicates a secondary battery. Tr51 and Tr52 are transistors. D51–D55 are diodes. F51 and F52 are fuses. L51 and L52 are choke coils. C51 and C52 are capacitors. R51–R53 are resistors.

The DC connector 520 is used for supplying external power when operating an electronic apparatus with an external power source through the AC adaptor, or when charging the built-in secondary battery 540. The DC to DC converter 500 is used to generate the voltage required for the electronic apparatus from the external power source supplied through the DC to DC connector 520 or from the built-in secondary battery 540.

The constant current circuit 530 is supplied with the external power source through the DC connector 520, and generates power required for charging the secondary battery 540 when the charging control section 510 instructs the constant current circuit 530 to charge the secondary battery 540.

The charging control section 510 is a control section for charging the secondary battery 540. Instructions for starting, stopping, and completing the charging are supplied to the constant current circuit 530 by the charging control section 510.

When the AC adaptor, etc., is connected to the DC connector 520, if the AC adaptor is deactivated because AC power source is not supplied to the AC adaptor, the diode D51 prevents the power of the built-in secondary battery 540 from flowing out. The diode D51 is a back-current-block protection diode.

The diode D52 supplies the power from the secondary battery 540 to the DC to DC converter 500 when no external power source is provided. Further, when the external power source is supplied through the DC connector 520, the diode D52 is operative as a protection diode which prevents a voltage of the external power source from being applied to the secondary battery 540.

The diode D55 prevents a back current from the secondary battery 540 to the constant current circuit 530.

The DC to DC converter 500 and the constant current circuit 530 are respectively constructed with conventional switching type regulators, etc. For the constant current control section 531, for example, an IC MB3759 made by FUJITSU L.T.D. is usable. For the DC to DC control section 501, for example, an IC MB3776A made by FUJITSU L.T.D. is usable.

When the AC adaptor, etc., is connected to the DC connector 520 to supply the external power, the external power source is applied to the DC to DC converter 500 through the diode D51, the DC to DC converter 500 producing the voltage required for the electronic apparatus. In this case, the power supplied from the external power source is blocked by the diode D52 and is not supplied to the secondary battery 540.

When the external power source is supplied, when the constant current circuit 530 is activated by the command of the charging control section 510 to produce the power for charging, the secondary battery 540 is supplied with power and is charged. When the constant current circuit 530 is deactivated, the transistor Tr51 is turned off, and thus, the external power is not supplied to the secondary battery 540.

When the external power supply is stopped, the power from the secondary battery 540 is supplied to the DC to DC converter 500 through the diode D52. In this case, the diodes D51, D55 prevent the power from the secondary battery 540 from flowing out of the DC to DC converter 500.

When the secondary battery 540 is charged, a voltage necessary for charging the secondary battery 540 is applied to a positive terminal of the battery through the constant current circuit 530. This voltage is also applied to the DC to DC converter 500 through the diode D52. A maximum voltage necessary for charging a conventional secondary battery such as NiCd batteries is approximately 1.7 times the voltage of the battery. The magnitude of this voltage is not so important, because the DC to DC converter 500 is the step-down-type converter.

In such conventional circuits, the diode D52 is necessary to protect the secondary battery 540 by separating a charging path to the secondary battery 540 from a discharging path from the secondary battery 540. However, when the power from the secondary battery 540 is supplied to the DC to DC converter 500, voltage dropping due to the diode D52 occurs, which reduces an efficiency of a battery use.

The voltage drop across the diode D52 is 0.55 V to 0.7 V. In the electronic apparatus using 6 NiCd batteries, a power loss due to the voltage dropping is 7.6% to 10% of the total battery capacity. In a small sized electronic apparatus using 2 NiCd batteries, the power loss due to the voltage dropping is 23% to 30% of the total battery capacity.

[Step-up-type Converter]

FIG. 2 shows a schematic diagram of another conventional charging-and-discharging device with a built-in charging device and the step-up-type converter. The device shown in FIG. 2 comprises a DC to DC converter 600, a charging control section 610 for controlling the charging, a DC connector 620 for connection with the AC adaptor, etc., and a constant current circuit for charging 630 for constructing the charging device. The DC to DC converter 600 includes a DC to DC control section 601. The constant current circuit 530 includes a constant current control section 631. The numeral 640 indicates a secondary battery. Tr61 and Tr62 are transistors. D61–D65 are diodes. F61 and F62 are fuses. L61/L62 is a transformer. L63 is a choke coil. C61 and C62 are capacitors. R61–R63 are resistors.

The DC connector 620 is used when operating the electronic apparatus with the external power source through the AC adaptor, or when charging the built-in secondary battery 640 by supplying the power from the external power source. The DC to DC converter 600 is used to generate the voltage required in the electronic apparatus from the external power source supplied through the DC to DC connector 620 or from the power of the built-in secondary battery 640.

The constant current circuit 630 is supplied with the external power source through the DC connector 620, and generates power required for charging the secondary battery 640 when the charging control section 610 instructs the constant current circuit 630 to charge the secondary battery 640.

The charging control section 610 is a control section for charging the secondary battery 640. The instructions of starting, stopping, and finishing the charging are supplied to the constant current circuit 630 by the charging control section 610.

When the AC adaptor, etc., is connected to the DC connector 620, if the AC adaptor is deactivated for a reason such that the AC power source is not supplied to the AC adaptor, the diode D61 prevents the power of the built-in secondary battery 640 from flowing out. The diode D61 is the back-current-block protection diode.

The diode D62 supplies the power from the secondary battery 640 to the DC to DC converter 600 when no external power source is supplied. Further, when the external power source is supplied through the DC connector 620, the diode D62 is operative as a protection diode which prevents the voltage of the external power source from being applied to the secondary battery 640.

The diode D65 prevents the back current from the secondary battery 640 to the constant current circuit 630.

The constant current circuit 630 is constructed with the conventional switching type regulators, etc. The constant current circuit 630 may use the same configuration as that of the constant current circuit 530 shown in FIG. 1.

The DC to DC converter 600 is a step-up-type switching regulator to raise the voltage of the secondary battery 640 to the voltage required for the electronic apparatus.

When the AC adaptor, etc., is connected to the DC connector 620 to supply the external power source, the external power source is applied to the DC to DC converter 600 through the diode D61, the DC to DC converter 600 producing the voltage required for the electronic apparatus. In this case, the power supplied from the external power source is blocked by the diode D62 and is not applied to the secondary battery 640.

When the external power source is supplied, in a case where the constant current circuit 630 is activated on the command of the charging control section 610 to produce the power for charging, the secondary battery 640 is supplied with the power and is charged. When the constant current circuit 630 is deactivated, the transistor Tr61 is turned off, and thus, the external power is not supplied to the secondary battery 640.

When the external power supply is stopped, the power from the secondary battery 640 is supplied to the DC to DC converter 600 through the diode D62. In this case, the diode D61 prevents the power from the secondary battery 640 from flowing out of the DC to DC converter 600.

When the secondary battery 640 is charged, a voltage necessary for charging the secondary battery 640 is applied to a positive terminal of the secondary battery 640 through the constant current circuit 630. This voltage is also applied to the DC to DC converter 600 through the diode D62. The voltage necessary for charging the conventional secondary battery such as NiCd batteries is approximately 1.7 times the voltage of the secondary battery 640. When several batteries are used in the electronic apparatus, the applied voltage to the DC to DC converter 600 may exceed an output voltage of the DC to DC converter 600. In this case, in the step-up-type DC to DC converter 600 using the choke coil means shown in FIG. 2, an input voltage is directly applied to a load through the choke coil L63 and the rectifying diode D64. Therefore, such DC to DC converter can not be used in the electronic apparatus with the built-in charging device.

For the above case, a step-up-and-down-type DC to DC converter 700 using transformer coupling means shown in FIG. 3 should be used. FIG. 3 shows a schematic diagram of another conventional charging-and-discharging device with the built-in charging device and the step-up-and-down-type converter. The device shown in FIG. 3 comprises the DC to DC converter 700, a charging control section 710 for controlling the charging, a DC connector 720 for connecting with the AC adaptor, etc., and a constant current circuit for charging 730 for constructing the charging device. The DC to DC converter 700 includes a DC to DC control section 701. The constant current circuit 730 includes a constant current control section 731. Numeral 740 indicates a secondary battery. Tr71 and Tr72 are transistors. D71–D75 are diodes. F71 and F72 are fuses. L71/L72 and L73/L74 are transformers. C71 and C72 are capacitors. R71–R73 are resistors.

The device shown in FIG. 3 has the same configuration as that of the device shown in FIG. 2 except that the DC to DC converter 700 is the step-up-and-down-type converter using the transformer coupling means. The constant current circuit 730 may have the same configuration as the circuit 530 shown in FIG. 1.

The step-up-type DC to DC converter 600 using the choke coil means shown in FIG. 2 may have an efficiency of around 80%. However, the efficiency of the step-up-and-down-type DC to DC converter 700 using the transformer coupling means shown in FIG. 3 is limited to around 60%.

As mentioned above, the conventional charging-and-discharging device with the step-up-type converter has the following two problems.

The first problem is that the diode D62 is necessary for protecting the secondary battery by separating the charging path to the secondary battery from the discharging path form the secondary battery. However, when the power from the secondary battery is supplied to the DC to DC converter 600, the power loss due to the voltage dropping across the diode D62 reduces the efficiency of the battery use.

The voltage drop across the diode D62 is 0.55 V to 0.7 V. In the electronic apparatus using 2 NiCd batteries, the power loss due to the voltage drop is 23% to 30% of the total battery capacity.

The second problem is that when the voltage necessary for charging the battery is applied to the positive terminal of the battery through the charging circuit, the voltage may be directly applied to the DC to DC converter 600 through the diode 62.

The voltage necessary for charging the conventional secondary battery such as NiCd batteries is approximately 1.7 times the discharging voltage of the secondary battery. When several batteries are used in the electronic apparatus, the applied voltage to the DC to DC converter may exceed the output voltage of the DC to DC converter. In this case, the DC to DC converter has to be constructed not with the step-up-type converter using the choke coil means but with the step-up-and-down-type converter using the transformer coupling means. The step-up-type DC to DC converter 600 using the choke coil means may have an efficiency of around 80%. However, the efficiency of the step-up-and-down-type DC to DC converter 700 using the transformer coupling means shown in FIG. 3 is limited to around 60%.

B. Over-Discharging Prevention Circuit

Next, a description will be given of conventional circuits for preventing the battery from over-discharging.

In the portable-type electronic apparatus such as note-type personal computers, a variety of batteries such as Li+ (lithium ion) secondary batteries, NiMH batteries, and NiCd batteries are usable. The Li+ battery and the NiMH battery may be easily damaged by over-discharging as compared to the NiCd battery. Once a user over-discharged such batteries by mistake, these batteries are damaged beyond repair. Therefore, to prevent degradation of the battery performance due to the mis-operation by the user, the battery typically includes the over-discharging prevention circuit which shuts off the output of the battery when the voltage of the battery drops below a given voltage.

To obtain an increased operational time of the electronic apparatus operated with the batteries, the apparatus may mount a plurality of batteries. Such apparatus typically includes a switching circuit for controlling the discharging in an input part of the battery to control discharging order of the battery.

When the above-mentioned apparatus having the switching circuit uses the battery with the built-in over-discharging prevention circuit, a path including the two switching circuits in series is formed and causes a large power loss across the switching circuits.

FIG. 4 shows a schematic diagram of a conventional over-discharging prevention circuit of the battery. In FIG. 4, numerals 800, 800' indicate battery packs. The battery pack 800, 800' includes secondary batteries 810, 810', and control sections 820, 820', preventing the over-discharging, respectively. Numeral 870 indicates an electronic apparatus consuming power, which includes a control section 881 controlling the discharge to the electronic apparatus 870. R80–R89 are resistors, FET81–FET85 are field-effect transistors (FETs) constructing switches, and D81–D83 are diodes.

The electronic apparatus 870 shown in FIG. 4 operates by being supplied with the power from one of the battery packs 800, 800', and an external power supply (DC-IN) through the AC adaptor, etc. The structure of the battery pack 800 is different from that of the battery pack 800'.

The diode D81 is used to prevent the power from the battery from flowing back to the DC-IN side when the power to the apparatus 870 is supplied from the battery pack 800 or the battery pack 800'. The diodes D82 and D83 are used to prevent the power from the DC-IN side from flowing back to the battery pack 800 or the battery pack 800' when the power to the apparatus 870 is supplied from the DC-IN. Specifically, because the transistors FET84 and FET85 have, respectively, a parasitic diode between a source and a drain, back-current-prevention diodes D82, D83 are required.

The transistor FET84 is the switching circuit for controlling the supply of the power from the battery pack 800, which is controlled to be turned on-and-off by the signal from the control section 881. When the transistor FET84 is turned on by the signal from the control section 881, the battery pack 800 is discharged. The transistor FET85 is a switching circuit for controlling the supply of the power from the battery pack 800', which is controlled to be turned on-and-off by the signal from the control section 881 in the same way as the transistor FET 84. When the transistor FET85 is turned on by the signal from the control section 881, the battery pack 800' is discharged.

The resistors R84, 85 are used for detecting a voltage to discriminate whether or not the power is supplied from the DC-IN. The resistors R86, 87 are used for detecting a voltage to discriminate whether or not the power is supplied from the battery pack 800. The resistors R88, 89 are used for detecting a voltage to discriminate whether or not the power is supplied from the battery pack 800'.

In a priority for supplying the power to the apparatus 870, a first priority is the DC-IN, a second is the battery pack 800, and a third is the battery pack 800'. When power supplied from the DC-IN is detected by the resistors R84, R85, the control section 881 controls the transistors FET84, FET85 to be maintained at an off state to stop supplying the power from battery pack 800 and the battery pack 800'. Thus, it prevents consumption of the power of the battery pack 800 and the battery pack 800'.

When a stoppage of the power supply from the DC-IN is detected by the resistors R84, R85, the control section 881 turns on the transistor FET84 to supply the power from the battery pack 800. At this time, to prevent the power of the battery pack 800' from being discharged, the transistor FET85 is maintained at the off state. In this case, if the transistor FET85 in an on state, both the battery pack 800 and the battery pack 800' may simultaneously supply the power to the apparatus 870.

When the resistors R86, R87 detect that the discharging of the battery pack 800 is completed and the secondary battery 810 discharges, the control section 881 turns on the transistor FET85 to supply power from the battery pack 800', and turns off the transistor FET84 to prevent the over-discharging of the battery pack 800. If an over-discharging prevention circuit is combined with the battery pack 800', the above operation is meaningless.

FIG. 5 shows a detail schematic diagram of the over-discharging prevention circuit in the battery pack 800 shown in FIG. 4. Elements R80–R83, FET81, FET82 shown in FIG. 5 correspond to the elements having the same reference numerals shown in FIG. 4. The battery pack 800 further includes comparators IC81–IC84, and reference voltages e81, e82.

The transistor FET81 is the switching circuit for opening the circuit when the secondary battery 810 is in the over-discharging state (the battery voltage is dropped below an given voltage) and when an over current flows from the battery by a short circuit of a load. The transistor FET81 is turned on-and-off by the comparators IC81, IC82. The transistor FET82 is the switching circuit for shutting the circuit to protect the battery when the charging voltage to the secondary battery 810 is increased above a given value. The transistor FET82 is turned on-and-off by the comparator IC83.

The comparator IC81 is used for comparing the battery voltage detected by the resistors R80, R81 with the reference voltage e82. When the battery voltage is dropped by the discharging of the secondary battery 810 below the reference voltage e82, the comparator IC81 produces a low level signal to turn off the transistor FET81 through the comparator IC84. Thus, the comparator IC81 provides an over-discharging prevention circuit.

To simplify the above description of the over-discharging prevention circuit, the circuit IC81 has been considered as a comparator. In practical use, to suppress a fluctuation of an output of the comparator IC81 which is caused by a fluctuation of the battery voltage due to an internal resistance Ri of the battery, the battery pack may include a flip-flop (FF) circuit for storing the signal that the comparator IC81 produces, and reset means for resetting the storage data of the flip-flop circuit when the battery voltage is restored by the charging, etc.

When an over current flows from the battery due to load short-circuiting, the comparator IC82 is used for detecting the over current to protect the battery from the short circuit by opening the circuit. Measurement of the over current is carried out by measuring a dropping voltage across the transistors FET81, FET82 constructing the switching circuit. When the over current flows by the load short-circuiting, a potential at a negative terminal of the battery pack 800 is increased in proportion to the current value by on-resistances of the transistors FET81, FET82. At this time, a potential of the reference voltage e81 is also increased. Therefore, when a current larger than a given value flows, the comparator IC82 comparing the potentials of the reference voltages e81, e82 produces the low level signal, and turns off the transistor FET81 through the comparator IC84.

In the above description, to simplify the description of the over current prevention circuit, the circuit IC82 has been considered as a comparator. In practical use, when the transistor FET81 is turned off, the output of the comparator IC82 is immediately returned to an high level. To prevent a variation of the output of the comparator IC82, the battery pack may include a flip-flop (FF) circuit for storing the signal that the comparator IC82 produces, and reset means for resetting the storage data of the flip-flop circuit when the short-circuit state is restored.

The comparator IC84 is a three-input comparator. When both of the inputs from the comparators IC81, IC82 are respectively higher than the reference voltage e82, the comparator IC84 produces the high level signal to turn on the transistor FET81. As mentioned above, when the battery is in the over-discharging state or when the over current flows from the battery by the short circuit, the transistor FET81 is turned off to open the circuit by the comparators IC81, IC82, IC84.

The comparator IC83 is an over-voltage detecting circuit to prevent a voltage higher than a specified voltage from being applied to the battery during charging. The comparator IC83 compares the charging voltage measured by the resistors R82, R83 with the reference voltage e81. As a result of the comparison, when the charging voltage is higher than the specified voltage, the comparator IC83 produces the low level signal and turns on the transistor FET82 to shut off current flow in a charging direction.

When the charging voltage is lower than the specified voltage, the comparator IC83 produces the high level signal and turns on the transistor FET82.

When the secondary battery 810 is in the over-discharging state and the transistor FET81 is off, if the charging voltage is applied to the positive terminal of the battery, the transistor FET81 does not intercept the current flow by the parasitic diode, therefore, the battery is charged. When the potential of the battery is raised by the charging of the secondary battery 810, the potential detected by the resistors R80, R81 exceeds the reference voltage e82 and the comparator IC81 produces the high level signal. At this time, the direction of the current flow through the transistors FET81, FET82 is the opposite of that at discharging. Therefore, the potential of the reference voltage e81 does not exceed the potential of the reference voltage e82, and the comparator IC82 also produces the high level signal. As a result, the comparator IC84 turns on the transistor FET81.

C. Plural-Battery-Pack Charging Circuit

Next, a description will be given of a conventional charging circuit mounting two battery packs. In general, based on the output voltage and the power of the battery, the battery pack is constructed with a plurality of battery cells which are connected in series. However, the number of the battery cells in series is limited according to the battery voltage and a power source voltage externally supplied. For example, with NiCd and NiMH batteries, the voltage per cell is 1.2 V, and the charging voltage is approximately 1.7 V. In general devices, a permitted voltage which will not damage a power supply circuit is 16.0 V. Therefore, with NiCd and NiMH batteries, the number of the battery cells in series is limited to 9. With the Li+ (lithium ion) battery, the voltage per cell is maximum 4.2 V. When the permitted voltage for the power supply circuit is 16.0 V, the number of battery cells in series is limited to 3.

Further, the capacity per battery cell is defined by a basic capacity based on battery size. Therefore, to increase the battery capacity, a plurality of groups, each of which has a plurality of battery cells connected in series, have to be connected in parallel.

When charging the secondary battery, it is necessary to control a maximum value of the charging current flowing into each battery. If a current larger than a specified value determined by the battery flows into the battery during charging, the battery is heated. Without an over-heating protection circuit, the battery may explode during the charging.

When the secondary batteries which are connected in series are charged, the same charging current flows through all battery cells. Therefore, by carrying out a constant current control on the charging device side, the battery may always be charged by a current lower than the specified current value.

However, when the secondary batteries which are connected in parallel are charged, the currents flowing through the respective batteries are different according to different impedances of the batteries and different charged or remaining power of the batteries. In a specific example, the charging current may flow only through one of the batteries connected in parallel and no current may flow through other batteries. In this case, the value of the charging current flowing through the one battery is n times the current which regularly flows through the batteries connected in parallel, where n is the number of batteries connected in parallel. Such increase of the charging current is extremely dangerous.

As mentioned above, at present, there is no proper charging method for the secondary batteries which are connected in parallel. Therefore, in general, the batteries connected in parallel are divided into a plurality of battery packs, and each of battery packs is individually charged. As a result, the charging device mounting the plurality of battery packs is proposed.

FIG. 6 shows a schematic diagram of the conventional charging device mounting two battery packs. In FIG. 6, an electronic apparatus includes a charging device 900, a DC connector 901, a DC to DC converter 902, a charging-and-discharging control section 920, and secondary battery packs 930, 940 (which are respectively indicated as a battery A, and a battery B). The charging device 900 has a control section 910 carrying out a constant current control. Tr91, FET91–FET94 are transistors, D91–D95 are diodes, F91, F92 are fuses, L92 is a choke coil, C91 provides a smoothing capacitor, and R90–R94 are resistors.

The DC connector 901 is used when the apparatus is driven by the external power source of the AC adaptor, etc., or when the power is supplied externally of the apparatus for charging the built-in secondary batteries. The DC to DC converter 902 is used for generating the voltage required for the apparatus by the external power source being supplied through the DC connector 901 or by the power being supplied from the built-in secondary batteries.

The charging device 900 is a constant current source for generating power required for charging the secondary batteries when the power is supplied externally through the DC connector 901.

When the AC adaptor is connected to the DC connector 901, if the AC adaptor is in the deactivated state because the AC power source is not supplied to the AC adaptor, etc., the diodes D91 and D95 prevent the power of the built-in secondary batteries from flowing out. The diodes D91 and D95 are the back-current-block prevention diodes.

The diodes D92, D93 supply the power from the secondary batteries to the DC to DC converter 902 when no external power source is supplied. Further, when the external power source is supplied through the DC connector 901, the diodes D92, D93 are operative as the protection diodes which prevents the voltage of the external power source from being applied to the secondary batteries.

When the power from the AC adaptor, etc., is not supplied through the DC connector 901, and the power from the secondary batteries is supplied to the DC to DC converter 902, the transistor FET93 and FET94 are operative as switching circuits for controlling whether the battery A or the battery B supplies the power. In a case where the power from both the batteries A and B is simultaneously discharged, the transistors FET93, FET94 are not necessary. The transistors FET91, FET92 are switching circuits for selecting a battery to be charged, and controls the flow of the charging current supplied from the charging device 900 either through the battery A or through the battery B.

The charging device 900 is the constant current circuit for charging, and comprises the main switching transistor Tr91, the choke coil L92, the flywheel diode D94, the smoothing capacitor C91, the sense resistors R90–R94 for controlling the current, and the control section 910. The constant current circuit for the charging 900 may be constructed with the conventional switching-type regulators, etc.

When the AC adaptor, etc., is connected with the DC connector 901 and external power is supplied, the external power is applied to the DC to DC converter 902 through the diode D91, wherein the DC to DC converter 902 produces the voltage required for the apparatus. In this case, the power supplied from the external power source is interrupted by the diodes D92, D93, and is not applied to the battery packs 930, 940 of the secondary batteries.

When external power is supplied, and when the constant current circuit for charging operates to generate the power for the charging, the secondary battery may be charged. When the constant current circuit is deactivated, the circuit is shut by the transistor Tr91, and, thus, the battery may not be charged.

When the external power supply is stopped, the power from the battery packs 930, 940 of the secondary batteries are supplied through the transistors FET93, FET94 and the diodes D92, D93. A source electrode of the transistor FET93 is connected to an anode side of the diode F92, and a drain electrode thereof is connected to the positive terminal side of the battery A. A gate electrode of the transistor FET93 is connected to a control signal from the charging-and-discharging control section 920. In the same way, a source electrode of the transistor FET94 is connected to an anode side of the diode F93, and a drain electrode thereof is connected to the positive terminal side of the battery B. A gate electrode of the transistor FET94 is connected to the control signal from the charging-and-discharging control section 920.

An internal parasitic diode of the transistor FET93 is oriented in a forward direction from the drain side to the source side. Therefore, the transistor FET93 operates as the switching circuit for the current flow from the battery A, but is maintained at the on state for the current flow into the battery A. To prevent a back current to the battery A, the diode D92 is connected in series to the transistor FET93. In the same way, an internal parasitic diode of the transistor FET94 is oriented in a forward direction from the drain side to the source side. Therefore, the transistor FET94 operates as the switching circuit for the current flow from the battery B, but is maintained at the on state for the current flow into the battery B. To prevent a back current to the battery B, the diode D93 is connected in series to the transistor FET94.

When the charging-and-discharging control section 920 detects that the input power supply from the DC-IN is stopped, the control section 920 turns on the transistor FET93 or the transistor FET94 to urge the battery to discharge. When the discharging from the battery A is instructed, the charging-and-discharging control section 920 turns on the transistor FET93 by setting the gate electrode of the transistor FET93 to a ground potential. When the discharging from the battery B is instructed, the charging-and-discharging control section 920 turns on the transistor FET94 by setting the gate electrode of the transistor FET94 to the ground potential.

The diode D91, D95 prevents power from the batteries A, B from flowing out of the DC to DC converter 902.

When the external power is supplied by the AC adaptor and the constant current circuit for the charging in the charging device 900 is operating, the power generated in the charging device 900 charges the battery A or the battery B through the transistor FET91 or FET92 for the switching. When the battery A is charged, the transistor FET91 is turned on to close the current path to the battery A. At this time, since the transistor FET92 is in the off state, all current from the constant current circuit is used for charging the battery A.

When the battery B is charged, the transistor FET92 is turned on to close the current path to the battery B. At this time, since the transistor FET91 is in the off state, all current from the constant current circuit is used for charging the battery B.

FIG. 7A shows a charging flowchart for the control section 910 and the charging-and-discharging control section 920 shown in FIG. 6. FIG. 7B shows a discharging flowchart for the control section 910 and the charging-and-discharging control section 920 shown in FIG. 6.

In the charging process shown in FIG. 7A, when it is detected that external power is supplied to the DC-IN (S21), the following processes are carried out. The charging-and-discharging control section 920 turns off the transistors FET93, FET94 (S22), and then, turns on the transistor FET91 and turns off the transistor FET92 (S23). On the other hand, the control section 910 turns on the transistor Tr91 to charge the battery A (S24). In a step S25, when the battery A is fully charged, and completion of the charging is detected, the process proceeds to step 26. In step S26, the transistor Tr91 is turned off. After that, the transistor FET91 is turned off, and the transistor FET92 is turned on (S27). And next, the transistor Tr91 is turned on to charge the battery B (S28). In step S29, when the battery B is fully charged, and completion of the charging is detected, the transistor Tr91 is turned off (S30).

In the discharging process shown in FIG. 7B, in step S41, the transistor FET93 is turned on, and the transistor FET94 is turned off to discharge the power from the battery A. When the potential of the battery A is lowered, and full discharge of the power in the battery A is detected in step 42, the transistor FET93 is turned off and the transistor FET94 is turned on to proceed to the discharging of the battery B in step S43. In step S44, when full discharge of the power in the battery B is also detected, a low-battery processing in the apparatus is started in a step 45.

In the conventional electronic apparatus provided with the plurality of battery packs shown in FIG. 6, the battery pack to be charged is selected by the switching circuit. After the charging for the first selected battery pack is completed, the next battery pack is selected to be charged. At present, such a serial charging is generally used.

In this way, when the plurality of battery packs are serially charged in the single charging circuit, a charged battery and an non-charged battery are not connected in parallel. Therefore, the switching transistors FET93, FET94 are required for controlling the discharging of each battery, and also the back-current-prevention diodes D92, D93 are required for preventing the charging and the discharging between the charged battery and the uncharged battery.

As a result, during the discharge of battery, a power loss due to resistivity of the switching transistors FET93, FET94, and a power loss due to a voltage drop across the back-current-prevention diodes D92, D93 is caused. These power losses reduce the operational efficiency of the battery.

There is a method for reducing the power loss by using FETs instead of the back-current-prevention diodes D92, D93. In the method, the transistors for switching and the FETs for the diodes are connected in series such that the internal parasitic diodes of the two different transistors are connected to each other in an opposite direction. However, the power loss due to the resistivity of the two FETs occurs.

Further, the method has a disadvantage that a cost of the FET is greater than twice the cost of the diode.

Also, since the plurality of battery packs are serially charged, the batteries can not be discharged in parallel except when the charging of all the batteries is completed. Therefore, even if a plurality of battery packs are provided, the batteries are discharged one by one. Thus, the maximum current value which can be discharged is restricted.

FIG. 8 shows a schematic diagram of a conventional charging apparatus having the same number of charging devices as batteries.

The apparatus shown in FIG. 8 includes charging devices 950, 950', a DC connector 951, a DC to DC converter 952, and secondary battery packs 970, 980 (which are referenced to batteries A, B). The charging devices 950, 950' respectively have control sections 960, 960' for carrying out the constant current control. Tr92 is a transistor, D90, D96–D99 are diodes, F93, F94 are fuses, L93 is a choke coil, C92 provides a smoothing capacitor, and R95–R99 are resistors.

The charging device 950 is used for charging the battery A, and the charging device 950' is used for charging the battery B. In this way, by providing a plurality of charging devices, charging time for the plurality of batteries can be reduced. However, to prevent a charging current to the battery A from flowing into the battery B, the back-current prevention diode D98 is required. In the same way, to prevent a charging current to the battery B from flowing into the battery A, the back-current prevention diode D97 is required.

As a result, when the battery is discharged, a voltage drop across the back-current prevention diodes D97, D98 occurs, which causes a power loss due to the drop. Therefore, the power loss reduces the operational efficiency of the battery. Further, there is a disadvantage that the number of circuits is increased due to an increase of the number of the charging devices.

(2) Problems of The Prior Art

A. Voltage Converter a) To separate the current path to the battery during charging from the current path from the battery during discharging, the diode has to be provided. The diode caused a power loss due to the voltage drop across the diode.

For example, when the electronic apparatus operates with two NiCd batteries, the power loss is approximately 20 to 25% of the total battery power.

b) In the apparatus including the step-up-type DC to DC converter using the choke coil, the conventional charging circuit can not be adapted to the apparatus. Therefore, the DC to DC converter is required to be changed to the step-up-and-down-type DC to DC converter using the transformer coupling means shown in FIG. 3. However, though the efficiency of around 80% is achieved in the step-up-type DC to DC converter using the choke coil, the efficiency in the step-up-and-down-type DC to DC converter using the transformer coupling means is limited to around 60%. In this converter, an effective usage of the battery is not obtained.

B. Over-Discharging Prevention Circuit

In the electronic apparatus mounting the plurality of battery packs, to prevent the respective batteries from discharging simultaneously, the output sections from the respective batteries need respective switching circuits for controlling the on-and-off state of the discharging circuit. However, when the over-discharging prevention circuit is equipped with the battery pack to prevent the degradation of the battery due to over discharging, the over-discharging prevention switching circuit in the battery pack and the discharging control switching circuit are connected in series. Therefore, the power loss across the switching circuits is doubled.

C. Plural-Battery-Pack Charging Circuit a) To charge the plurality of batteries, the switching circuits for switching the current flow at the charging and the back-current prevention diodes are inserted. However, the switching circuits and the diodes cause power losses due to the voltage drops across the switching circuits and the diodes at the discharging from the battery.

For example, when the electronic apparatus operates with two NiCd batteries, the power loss is approximately 20 to 25% of the total battery power.

There is the method for reducing the power loss by using the FETs instead of the back-current prevention diodes. However, the transistor for the switching circuit and the FET for the diode need to be connected in series. Therefore, the power loss for two FETs occurs. Further, the method has the disadvantage that the cost of the FET is approximately twice the cost of the diode.

b) Since the plurality of batteries are serially charged in the single charging device, the total charging time for the batteries is increased according to the number of batteries.

c) To carry out the parallel charging for reduction of the total charging time for the batteries, the same number of charging devices as the batteries is necessary.

d) Since the discharging from the plurality of batteries is serially carried out, the maximum current value which can be discharged is restricted. To increase the maximum discharging current value, parallel discharging from the batteries is required. However, since the charging of the batteries is serially carried out, it is difficult to perform parallel discharging.

SUMMARY OF THE INVENTION

It is an object of this invention to remove a diode for preventing a back current from a DC-IN input to a battery in a charging-and-discharging device. This eliminates a power loss due to the diode during discharging from the battery.

It is another object of this invention to reduce switching circuits for controlling the discharging in an electronic apparatus and to reduce a power loss across the switching circuits in the charging-and-discharging device. In the device, an over-discharging prevention switch within a battery pack may be controlled externally as well as internally by an additional control signal.

A still another object of the present invention is to increase an operational time in the electronic apparatus having a plurality of battery packs. The invention provides a charging control method for reducing constant current circuits and reducing total charging time for batteries, in which the plurality of secondary batteries may be charged in parallel in the signal constant current circuit. Since the plurality of secondary batteries may be charged in parallel, a switching circuit for controlling current paths between the batteries is removed. Thus, a power loss across the switching circuit at the discharging of the battery is eliminated.

This permits the disadvantages described above to be eliminated.

The objects described above are achieved by a charging-and-discharging device in an electronic apparatus including a rechargeable battery and a charging device for charging the battery, the charging-and-discharging device comprising: a switching circuit electrically isolating one terminal side of the battery from a ground side of the electronic apparatus; and a charge control section controlling to isolate the one terminal side of the battery from the ground side of the electronic apparatus by turning off the switching circuit at the charging of the battery; wherein the one terminal side of the battery is isolated from the ground side of the electronic apparatus by the switching circuit during charging of the battery and a closed loop including the charging device and the battery is formed to charge the battery.

According to the charging-and-discharging device, the one terminal of the battery is separated from the ground side of the apparatus at the charging, and the closed loop is formed between the charging device and the battery. Therefore, the potential of the battery during charging is independent of the potential of the apparatus. And, the back-current prevention diode necessary for the conventional charging-and-discharging device may be removed. Therefore, the power loss due to the diode voltage drop at the discharging is zero, which improves the efficiency of the battery use. Further, the input voltage (against the ground potential) to a DC to DC converter in the apparatus is the same as an eternal power source even if the battery is charged. Therefore, the battery can be charged regardless of the method of the DC to DC converter in the electronic apparatus.

The object described above is also achieved by a charging-and-discharging control device in a battery pack mounting a rechargeable battery, the charging-and-discharging control device comprising: a switching circuit preventing an over discharging of the battery; a control section to turn off the switching circuit when the over discharging of the battery is detected; and an input terminal for receiving a control signal to control the switching circuit externally of the battery pack; wherein the control section turns off the switching circuit to stop discharging when the over discharging of the battery is detected or when the control signal for stopping the discharging is applied to the input terminal.

The above charging-and-discharging control device may construct a battery pack with a rechargeable battery.

According to the battery pack, the over-discharging prevention switching circuit provided in the battery pack may also be used as the switching circuit for switching the battery packs by the control of the electronic apparatus. Therefore, the switching circuit does not need to be provided within the apparatus. And, since the switching circuit is unnecessary in the apparatus, the power loss due to the resistivity of the switching circuit is reduced to zero. This achieves the efficient operation of the battery. Namely, the power loss of the switching circuit in the electronic apparatus, except for the loss in the battery pack, may be reduced.

The object described above is also achieved by a charging-and-discharging device for charging a plurality of rechargeable batteries, the device comprising a charging device controlling voltages of the charging for the plurality of batteries to be constant and controlling a charging current of each of the batteries not to exceed a maximum charging current; wherein the charging device charges the plurality of batteries in parallel.

In the above charging-and-discharging device, the charging device may comprise a constant-voltage-and-constantcurrent circuit including a plurality of current measuring error amplifiers corresponding to the plurality of batteries and a voltage controlling error amplifier having a plurality of voltage inputs, wherein each of the current measuring amplifiers measures the charging current of each of the batteries, and the voltage controlling error amplifier detects a difference between the voltages of the charging for the plurality of batteries.

According to the charging-and-discharging device, the plural batteries can be charged in parallel by the single charging device. And, since the plural batteries are charged in parallel, the switching circuit for switching the current paths to the batteries may be removed, and the diode for preventing the back current is also removed. This removal improves the efficiency of the battery use. Further, since the plural batteries are charged in parallel, the total charging time for the plural batteries is the same as the charging time for a single battery. Furthermore, since the control circuit controlling the parallel charging to the plural batteries may be integrated to a circuit, a small-sized apparatus is easily provided.

The object described above is also achieved by a charging-and-discharging device in an electronic apparatus including a plurality of rechargeable batteries and a charging device having a constant current circuit for charging the batteries, the charging-and-discharging device comprising: a plurality of switching circuits turning on and off paths between the constant current circuit of the charging device and the batteries; a switching control section for alternately switching the plurality of switching circuits at a given time interval such that the constant current circuit of the charging device could be connected to only one of the batteries during charging; wherein the switching circuit is time-divisionally switched, and thereby, the plurality of batteries are time-divisionally charged.

According to the charging-and-discharging device, in the single charging device, the plurality of batteries can be charged in parallel. Also, the plurality of batteries are time-divisionally charged by being switched alternatively, and, thus, parallel charging is carried out. Therefore, parallel discharging from the plural batteries is permitted. Since the plurality of the batteries are charged in parallel, parallel discharging from the batteries may be realized. Therefore, the maximum current value which can be discharged may be increased. Further, the switching circuit for switching the batteries during discharging becomes unnecessary, and, thus, the power loss due to the switching circuit may be reduced. Since the switching circuit for preventing the back current from the external power source is necessary, the total power loss is reduced by 50% as compared to the conventional method.

Other objects and further features of the present invention will be apparent from the following detailed description when read in conjunction with the accompanying drawings.

BRIEF DESCRIPTION OF THE DRAWINGS

FIG. 7A shows a charging flowchart in a control section and a charging-and-discharging control section shown in FIG. 6;

FIG. 7B shows a discharging flowchart in the control section and the charging-and-discharging control section shown in FIG. 6;

DESCRIPTION OF THE PREFERRED EMBODIMENTS

Figure 9A:
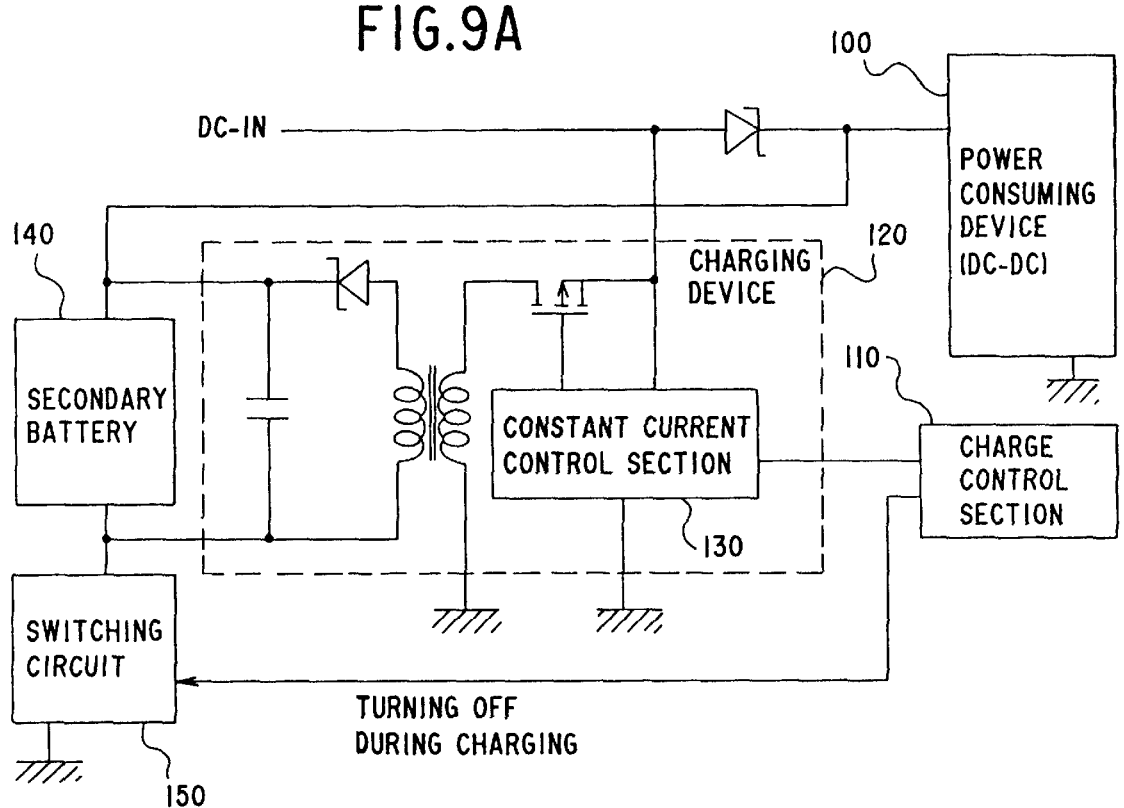
FIG. 9A shows a schematic diagram of a charging-and-discharging device according to the present invention.

First, a description will be given of a principle of a charging-and-discharging device according to the present invention, by referring to FIGS. 9A, 9B, and FIGS. 10A, 10B. FIG. 9A shows a schematic diagram of the charging-and-discharging device according to the present invention. The charging-and-discharging device shown in FIG. 9A comprises a power consuming device 100 having a DC to DC converter, a charge control section 110, a charging device 120, a constant current control section 130, a rechargeable secondary battery 140, and a switching circuit 150. The power consuming device 100 may be, for example, a main circuit of a portable-type electronic apparatus.

In the charging-and-discharging device shown in FIG. 9A, the electrical switching circuit is located to separate a ground side of the device from a negative terminal side of the secondary battery 140. The switching circuit 150 is controlled by a signal from the charge control section 110. When the battery is charged, the ground side of the device is separated from the negative terminal side of the secondary battery 140 by the switching circuit 150, and a closed loop is constructed between the charging device 120 and the secondary battery 140 to charge the secondary battery 140.

In this way, the diode for preventing a back current from a DC-IN input to the secondary battery 140 is removed, and, thus, a power loss due to the diode during the discharging of the secondary battery 140 may be eliminated.

As described above, the present invention has the following features.

(1) Since the negative terminal of the secondary battery 140 is separated from the ground side of the apparatus during the charging, and the closed loop is formed between the charging device 120 and the secondary battery 140, the potential of the battery at the charging is independent of the potential of the apparatus.

(2) The back-current prevention diode passing the discharging current from the positive terminal of the secondary battery 140 may be removed. Therefore, the power loss due to the power drop across the diode during the discharging is zero, which improves the efficiency of the battery use.

(3) The input voltage (against the ground potential) to the DC to DC converter in the apparatus is the same as the DC-IN voltage even if the secondary battery 140 is charged. Therefore, the secondary battery 140 can be charged regardless of the method of the DC to DC converter in the current consuming apparatus 100.

Figure 9B:
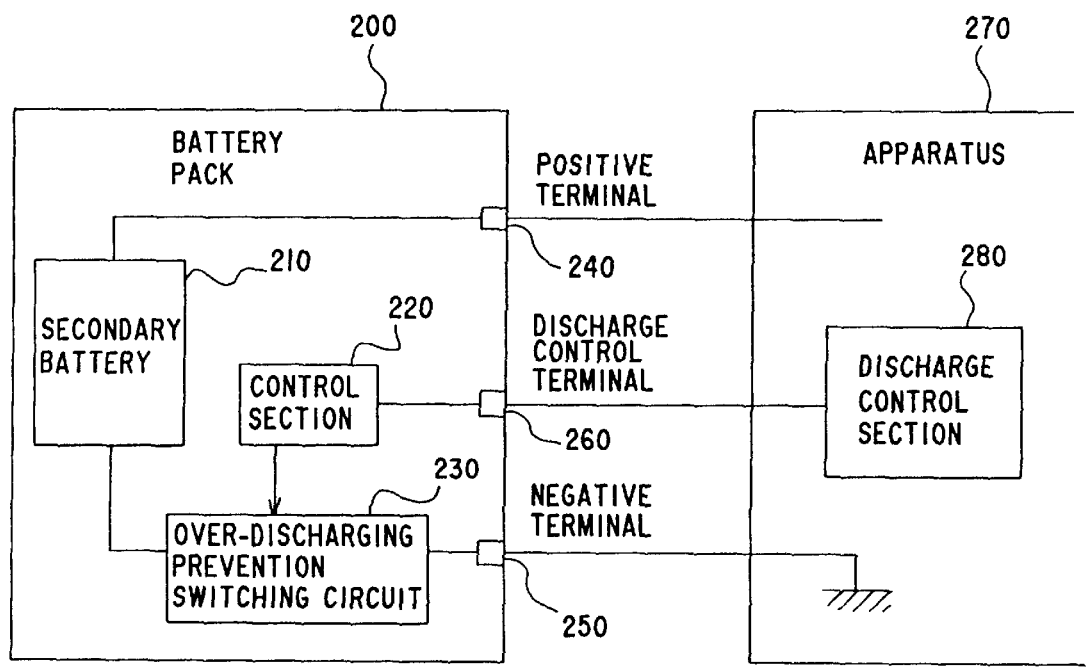
FIG. 9B shows a block diagram of another charging-and-discharging control device according to the present invention.

FIG. 9B shows a block diagram of another charging-and-discharging control device according to the present invention. The charging-and-discharging control device comprises a battery pack 200, or an apparatus 270 having the DC to DC converter. The battery pack 200 comprises a rechargeable secondary battery 210, a control section 220 controlling the discharging from the battery pack 200, an over-discharging prevention switching circuit 230, a positive terminal 240 of the battery pack 200, a negative terminal 250 thereof, and a discharge control terminal 260. The apparatus 270 may be, for example, a portable-type electronic apparatus, and includes a discharge control section 280 controlling to stop or permit discharging.

As mentioned above, the battery pack 200 includes the over-discharging prevention switching circuit 230 preventing the over discharging of the secondary battery 210. However, a signal controlling the on and off state of the over-discharging prevention switching circuit 230 can be supplied from the external apparatus 270. To receive the control signal in the battery pack 200, the discharge control terminal 260 is provided to the battery pack 200 in addition to the positive terminal 240 and the negative terminal 250. When the control signal for stopping the discharging is supplied to the discharge control terminal 260 by the discharge control section 280 in the apparatus 270, the control section 220 forcibly turns off the over-discharging prevention switching circuit 230. In this way, the over-discharging prevention switching circuit 230 is also used for controlling to stop or permit discharging by the apparatus 270.

As described above, the present invention has the following features.

(1) The over-discharging prevention switching circuit 230 provided in the battery pack 200 may also be used as the switching circuit for switching the battery packs by the control of the apparatus 270. Therefore, the switching circuit does not needs to be provided in the apparatus 270.

(2) Since the switching circuit is unnecessary in the apparatus 270, the power loss due to the resistivity of the switching circuit is reduced to zero. This permits efficient operation of the battery. Namely, the power loss of the switching circuit in the electronic apparatus, except for the loss in the battery pack 200, may be reduced.

Figure 10A:
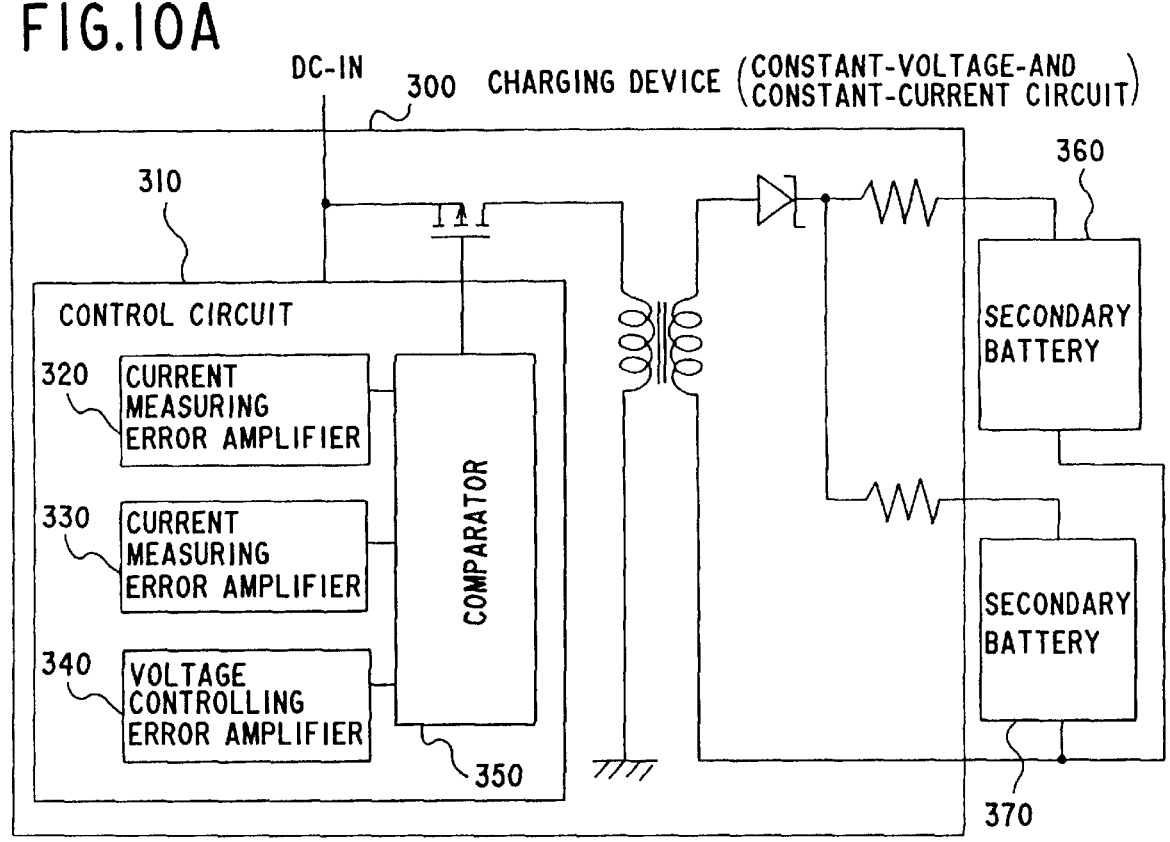
FIG. 10A shows a block diagram of still another charging-and-discharging device and a constant-voltage-and-constant-current control circuit according to the present invention.

FIG. 10A shows a block diagram of still another charging-and-discharging device and a constant-voltage-and-constant-current control circuit according to the present invention. A charging circuit (a constant-voltage-and-constant-current circuit) 300 constitutes the charging-and-discharging device and includes a control circuit for the charging 310 which constitutes the constant-voltage-and-constant-current control circuit. The control circuit 310 comprises current measuring error amplifiers 320, 330, a voltage controlling error amplifier 340, and a comparator 350. The charging device 300 may have two secondary batteries 360, 370.

In the control circuit 310 of the charging device 300 for charging the secondary batteries 360, 370, a plurality of voltages are supplied for a voltage detection input of the voltage controlling error amplifier 340. The current measuring error amplifiers 320, 330 are provided for the secondary batteries 360, 370.

Since such a constant-voltage-and-constant-current circuit is used as the charging device 300, the plural secondary batteries 360, 370 can be simultaneously charged in parallel by the single constant current circuit. Since the plural secondary batteries 360, 370 are charged in parallel by using the constant-voltage-and-constant-current circuit, a switching circuit for controlling current paths between the constant-voltage-and-constant-current circuit and the secondary batteries 360, 370 may be eliminated. Further, since the switching circuit for controlling the current paths between the constant-voltage-and-constant-current circuit and the secondary batteries 360, 370 is eliminated, a power loss due to the switching circuit during discharging of the battery may also be eliminated.

As described above, the present invention has the following features.

(1) The plural secondary batteries 360, 370 can be charged in parallel in the single charging device 300.

(2) Since the plural secondary batteries 360, 370 are charged in parallel, the switching circuit for switching the current paths to the batteries may be removed, and the diode for preventing the back current is also removed. This removal improves the efficiency of the battery use.

(3) Since the plural secondary batteries 360, 370 are charged in parallel, the total charging time for the plural secondary batteries is the same as the charging time for a single battery.

(4) Since the control circuit 310 controlling the parallel charging to the plural secondary batteries may be integrated with a circuit, a small-sized apparatus is easily realized.

Figure 10B:
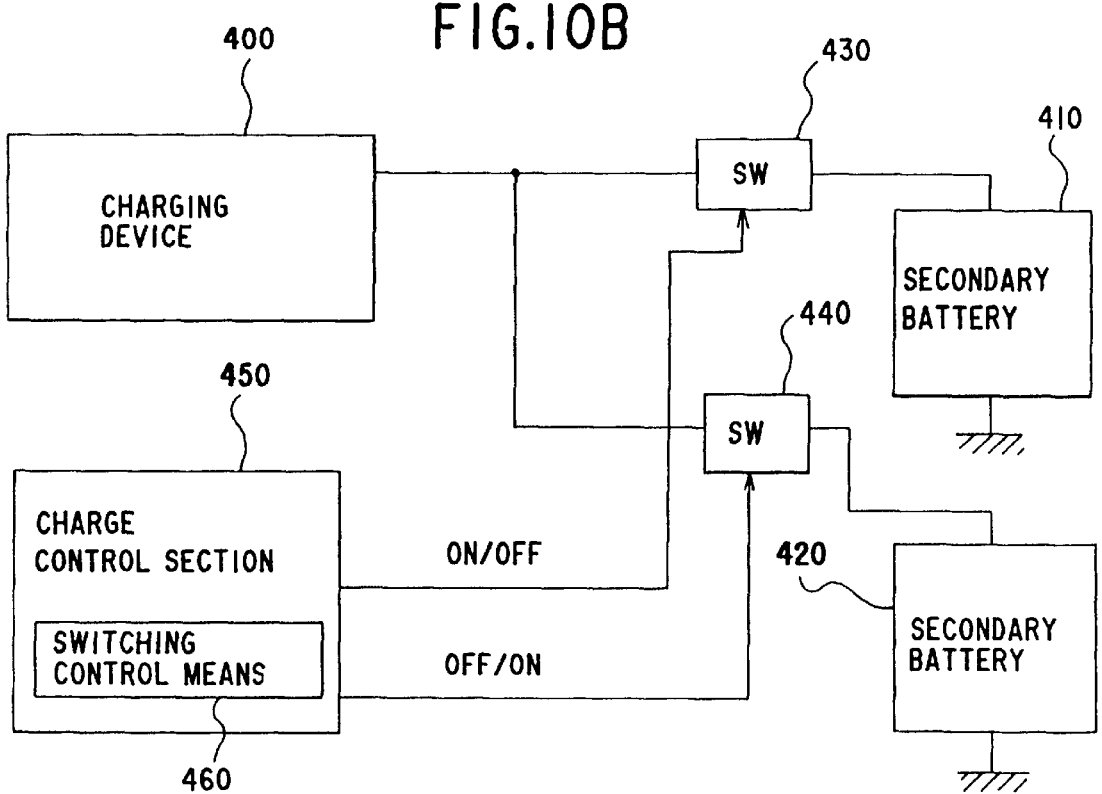
FIG. 10B shows a block diagram of another charging-and-discharging device according to the present invention.

FIG. 10B shows a block diagram of another charging-and-discharging device according to the present invention.

The charging-and-discharging device shown in FIG. 10B includes a charging device 400 and a charge control section 450 having switching control means 460. Switching circuits 430, 440 for switching the charging are located in charging paths to the secondary batteries 410, 420.

The electronic apparatus shown in FIG. 10B includes the plurality of rechargeable secondary batteries 410, 420, and a charging device 400 for charging the secondary batteries 410, 420. In the electronic apparatus, the switching circuits 430, 440 are located to control the paths between the charging device 400 and the secondary batteries 410, 420. The switching control means 460 in the charge control section 450 alternatively controls the switching circuits 430, 440 at a certain time interval. For example, when the switching control means 460 turns on the switching circuit 430 to connect the charging device 400 to only the secondary battery 410, the switching control means 460 turns off the switching circuit 440, and vice versa. In this way, the switching circuits 430, 440 are time-divisionally switched. Therefore, the plural secondary batteries 410, 420 are also time-divisionally charged. Further, in the device, the charging currents for the plural batteries are individually controlled, and the plural secondary batteries 410, 420 are simultaneously charged.

As described above, the present invention has the following features.

(1) In the single charging device 400, the plurality of secondary batteries 410, 420 can be charged in parallel. Also, the plurality of secondary batteries are time-divisionally charged by being alternatively switched, and, thus, the parallel charging is carried out. Therefore, parallel discharging from the plural batteries is permitted.

(2) Since the plurality of secondary batteries 410, 420 are charged in parallel, parallel discharging from the batteries may be obtained. Therefore, the maximum current value which can be discharged may be increased.

(3) The switching circuit for switching the batteries during discharging becomes unnecessary, and, thus, the power loss due to the switching circuit may be reduced. Since the switching circuit for preventing the back current from the DC-IN is necessary, the total power loss is reduced by 50% as compared to the conventional method.

Figure 11:
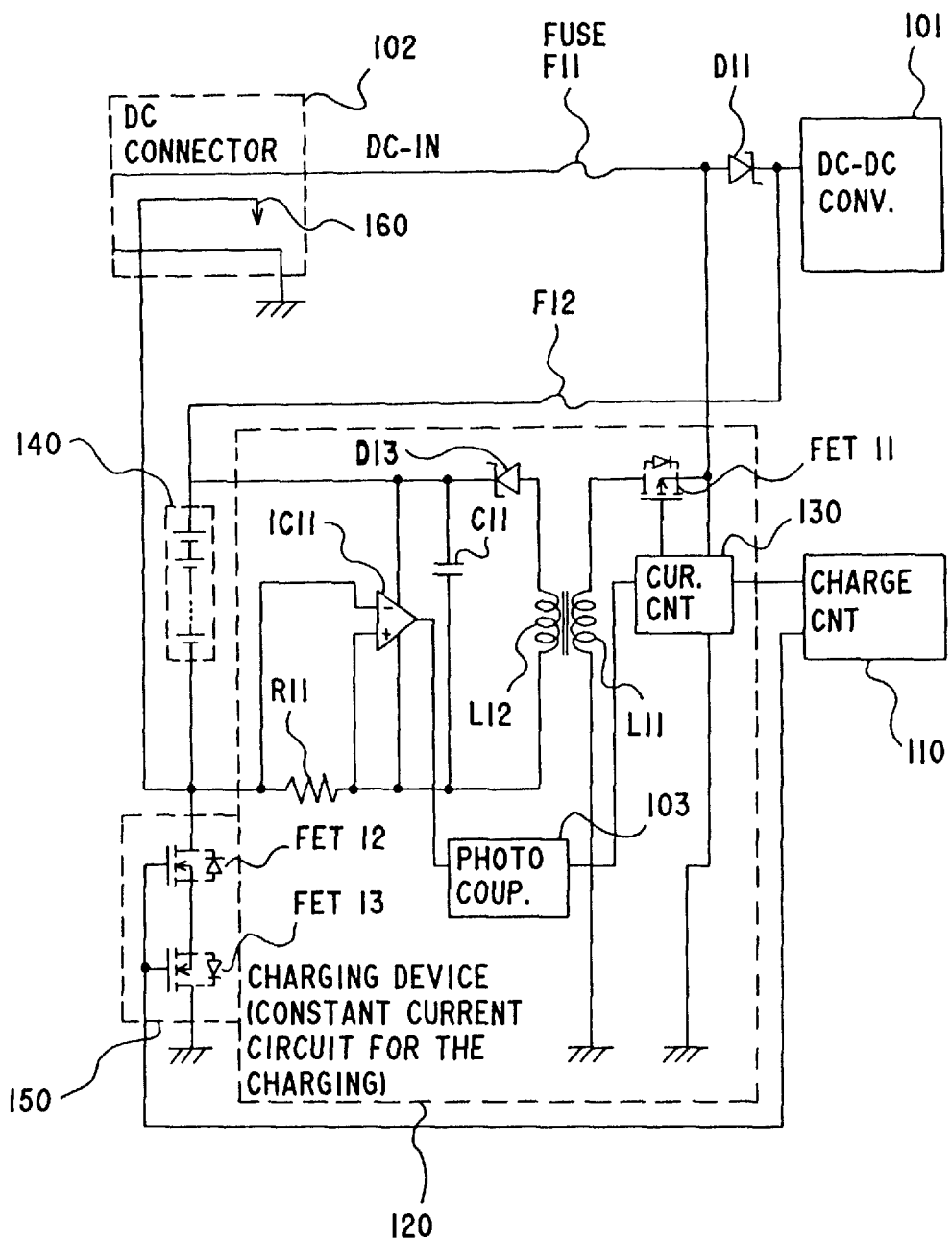
FIG. 11 shows a schematic diagram of a first embodiment of the charging-and-discharging device according to the present invention.

Next, a description will be given of a first embodiment of the charging-and-discharging device according to the present invention. FIG. 11 shows a schematic diagram of the first embodiment of the charging-and-discharging device according to the present invention.

The device shown in FIG. 11 comprises a DC to DC converter 101, a DC connector 102, a charge control section 110, a charging device 120 (as the constant current circuit for the charging), a secondary battery 140, a switching circuit 150, and a ground-side contacting circuit 160 for the DC connector 102. The charging device 120 includes a photo coupler 103 and a constant current control section 130. FET11–FET13 are transistors, D11, D13 are diodes, F11, F12 are fuses, L11/L12 is a transformer, R11 is a resistor, C11 is a capacitor, and IC11 is an error amplifier.

Figure 1:
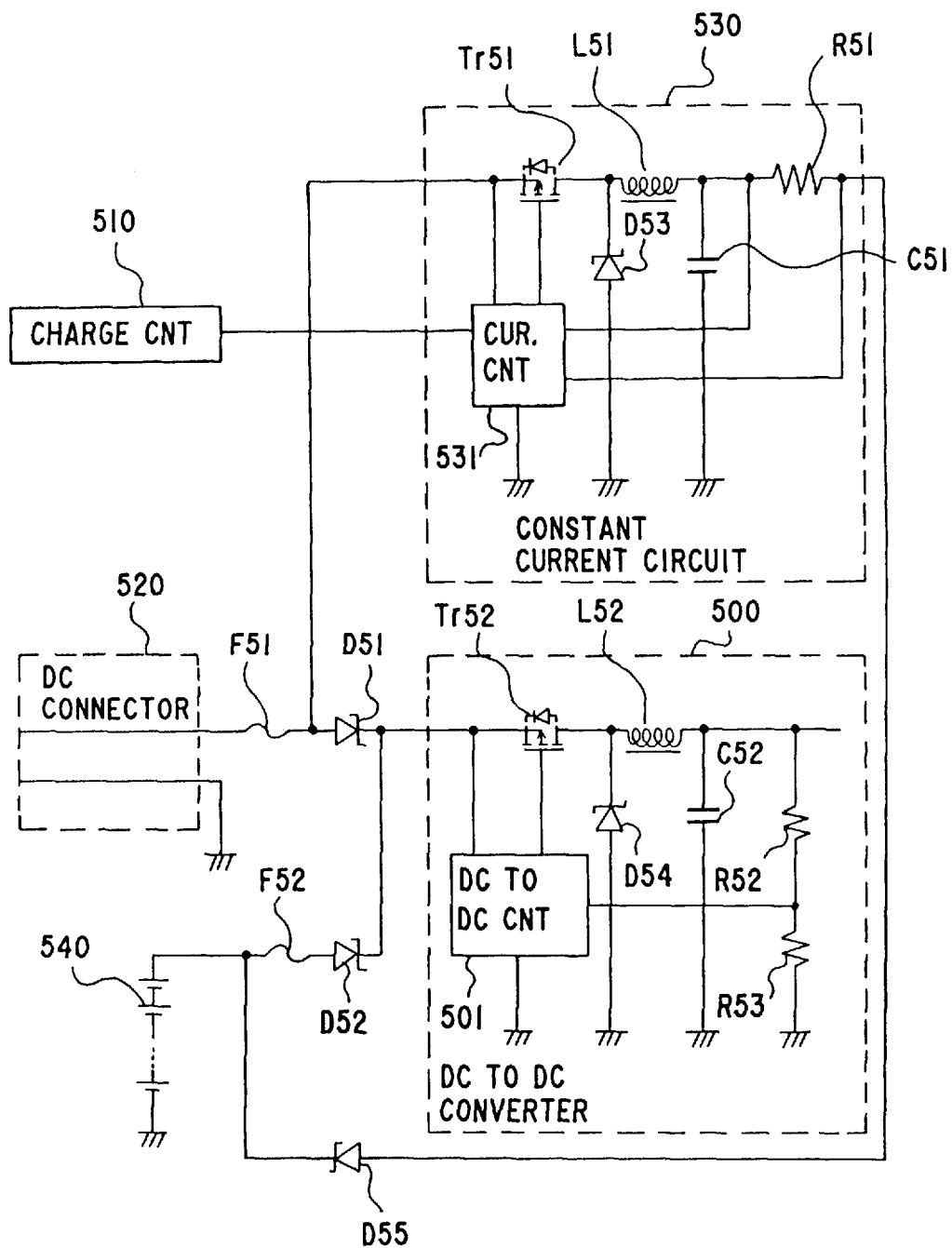
FIG. 1 shows a schematic diagram of a conventional charging-and-discharging device with a built-in charging device and a step-down-type converter.
Figure 2:
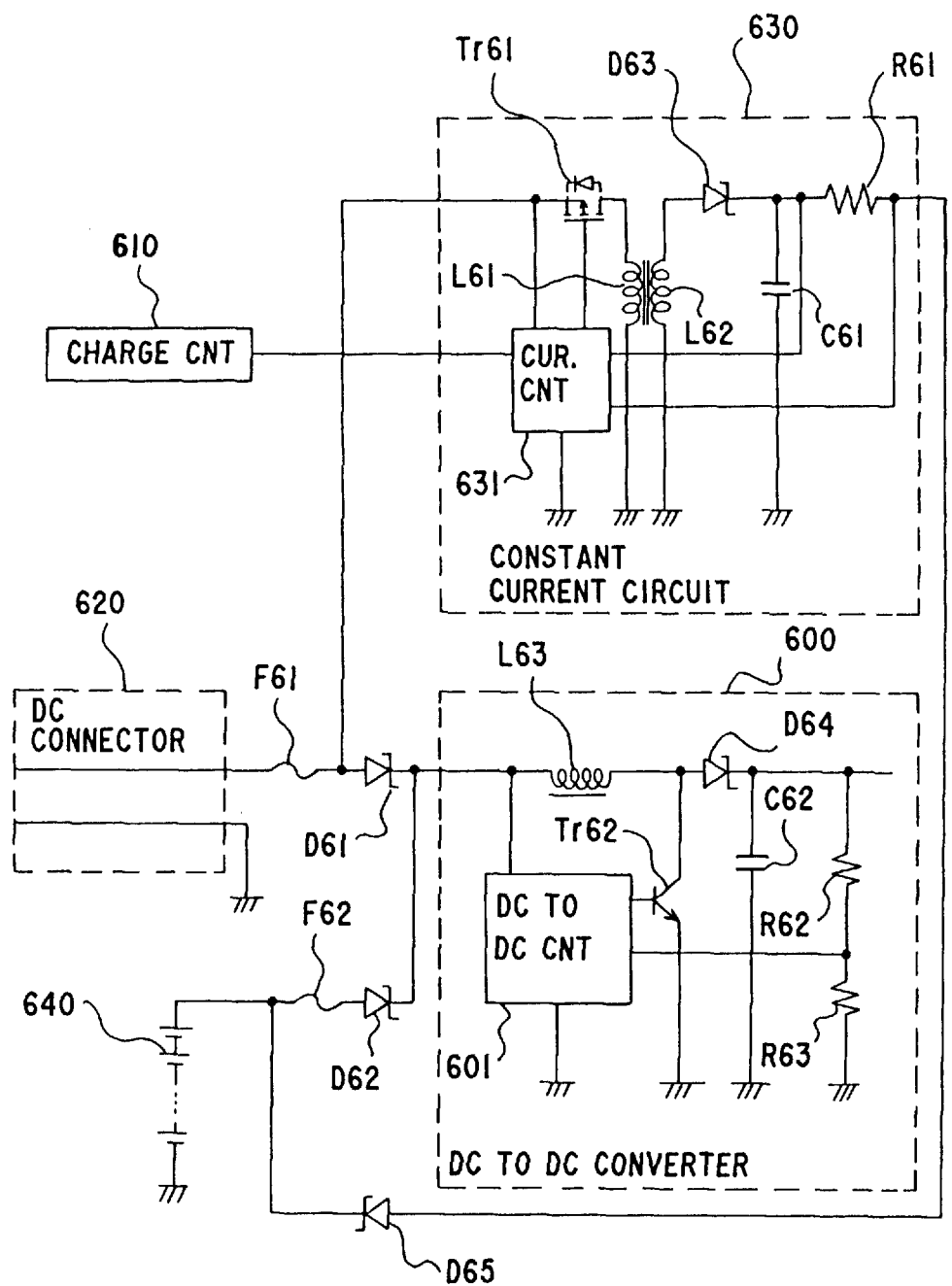
FIG. 2 shows a schematic diagram of another conventional charging-and-discharging device with a built-in charging device and a step-up-type converter.
Figure 3:
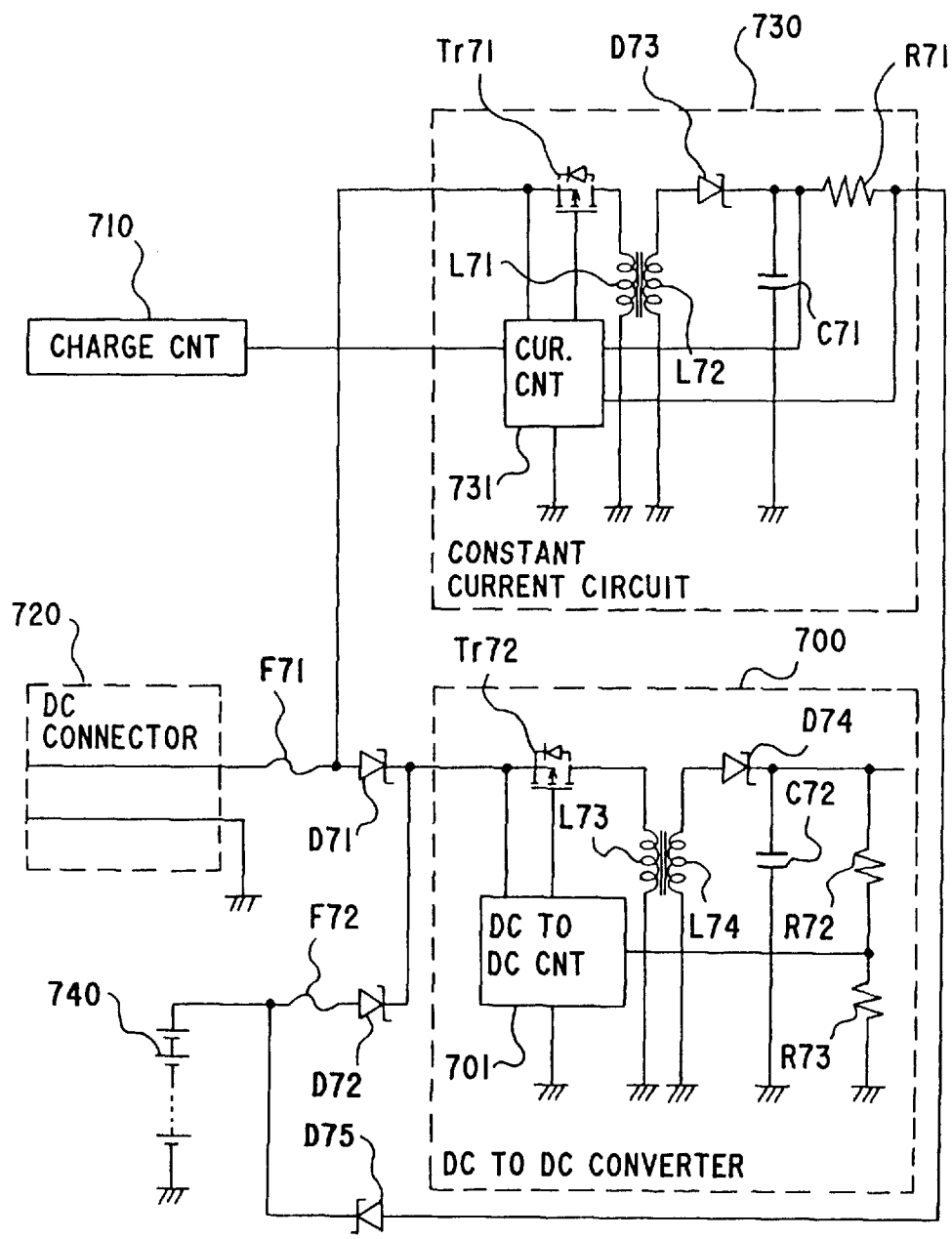
FIG. 3 shows a schematic diagram of another conventional charging-and-discharging device with a built-in charging device and a step-up-and-down-type converter.

The DC connector 102, the DC to DC converter 101, the charging device (the constant current circuit for the charging) 120, the charge control section 110, the diode D11 have, respectively, the same functions as those of the DC connector 620, the DC to DC converter 600, the constant current circuit for the charging 630, the charge control section 610, the diode D61 shown in FIG. 2.

The ground-side contacting circuit 160 of the DC connector 102 and the transistors FET12, FET13 are electrical switching circuits which are provided to separate the ground side of the apparatus from the negative terminal side of the battery. The ground-side contacting circuit 160 of the DC connector 102 is a mechanical contacting circuit, in which the apparatus ground and the negative terminal of the battery are separated from each other when the AC adaptor, etc., is connected to the DC connector 102.

In the ground-side contacting circuit 160 of the DC connector 102, when no element is connected to the DC connector 102, the mechanical contact is connected to the ground side. In this case, the ground-side contacting circuit 160 is used for connecting the ground of the apparatus to the negative terminal side of the battery.

The transistors FET12, FET13 detect the potential of the DC connector 102. When external power is supplied through the DC connector 102, the transistors FET12, FET13 are turned off, and when no power is supplied, the transistors FET12, FET13 are turned on. In this way, the transistors FET12, FET13 construct the switching circuit 150 for turning on and off the path between the ground of the apparatus and the negative terminal side of the battery. The switching circuit 150 is operated as follows: i) a case where the AC adaptor, etc., is connected to the DC connector 102, and the AC adaptor is deactivated for a reason such as that no AC power source is supplied to the AC adaptor, ii) a case where the negative terminal side of the secondary battery 140 is not connected to the ground of the apparatus through the contact of the DC connector 102. In these cases, the switching circuit 150 connects the negative terminal side of the secondary battery 140 to the ground side of the apparatus.

The transistor FET11 is a main switching transistor of the constant current circuit for the charging. The transformer L11/L12 is a transformer for voltage transforming. The diode D13 is a rectifying diode. The capacitor C11 is a smoothing capacitor. The resistor R11 is a sense resistor for measuring the value of the current charged in the battery. The error amplifier IC11 is used for measuring the voltage drop due to the current flowing through the sense resistor and for feeding the measured current value back to the constant current control section 130. The photo coupler 103 is used for transmitting information of the error amplifier IC11 to the constant current control section 130.

When the AC adaptor, etc., is connected to the DC connector 102 and external power is supplied, the external power is supplied to the DC to DC converter 101 through the diode D11. The DC to DC converter 101 generates the voltage necessary for the apparatus. Therefore, even though the power supplied from the external power source is applied to the positive terminal side of the secondary battery 140, the negative terminal side of the secondary battery 140 is isolated from the ground of the apparatus (equal to a negative electrode of the external power source) by the ground-side contacting circuit 160 and the transistors FET12, FET13. Therefore, no power is supplied to the secondary battery 140.

When external power is supplied, and when the constant current circuit for the charging is generating the power for charging under the command of the charge control section 110, the secondary battery 140 is supplied with power and is charged. When the constant current circuit for the charging operates, the external power is transformed to an alternating-current (AC) signal through the main switching transistor FET11, the AC signal being applied to the transformer side L11 and is transferred to the side L12. The voltage transferred to the L12 side is transformed to a direct-current (DC) signal by the rectifying diode D13, the DC signal being applied to the positive terminal of the secondary battery 140.

The current of the constant current circuit for charging is applied to the built-in secondary battery 140 through the diode D13. However, since the negative terminal side of the secondary battery 140 is isolated from the ground of the apparatus by the ground-side contacting circuit 160 and the transistors FET12, FET13, all of the power generated in the constant current circuit flows into only the built-in secondary battery 140. Though a positive terminal side of the constant current circuit is connected to the positive potential side of the apparatus, a negative terminal side of the constant current circuit is connected to only the negative terminal side of the battery. Therefore, no affection is given to the positive potential of the apparatus by the constant current circuit.

When the constant current circuit for charging is deactivated on the instruction or command of the charge control section 110, the transistor FET11 is maintained in the off state, and, thus, the input power is not transferred to the L12 side. Since the diode D13 is connected to the secondary battery 140 in an opposite direction, no current is discharged from the secondary battery 140 through the L12 side.

When the external power supply is stopped by, for example, pulling the AC adaptor from DC connector 102, since the positive terminal of the secondary battery 140 is directly connected to the DC to DC converter 101 and the negative terminal of the secondary battery 140 is connected to the ground of the apparatus through the contact of the DC connector 102, the voltage of the secondary battery 140 is directly transferred to the DC to DC converter 101. The diode D11 prevents the power from the secondary battery 140 from flowing into circuits except the DC to DC converter 101.

Though the AC adaptor, etc., is connected to the DC connector 102, the AC adaptor is deactivated when the AC adaptor is not provided with the AC power source. In this case, when the negative terminal side of the secondary battery 140 is not directly connected to the ground of the apparatus through the contact of the DC connector 102, the transistors FET12, FET13 are turned on. Therefore, the negative terminal side of the secondary battery 140 and the ground side of the apparatus are connected through the transistors FET12, FET13.

As mentioned above, in the first embodiment, the electrical switching circuit 150 is provided to separate the ground side of the apparatus from the negative terminal side of the battery. By the switching of the switching circuit 150, the closed loop with the charging device 120 and the secondary battery 140 is formed to perform the charging. Therefore, the diode (for example, diode D62 shown in FIG. 2), which prevents the battery from being charged from the DC-IN input, is unnecessary. Accordingly, the power loss due to the voltage drop across the diode may be eliminated. The elimination improves the efficiency of the battery use.

Since the charging is performed by forming the closed loop with the charging device and the battery in the charging method according to the present invention, the DC to DC converter is not supplied with a voltage higher than that of the DC-IN. Therefore, the step-up-type DC to DC converter using the choke coil is also used for the charging-and-discharging device according to the present invention. This improves the efficiency of the DC to DC converter.

Figure 12:
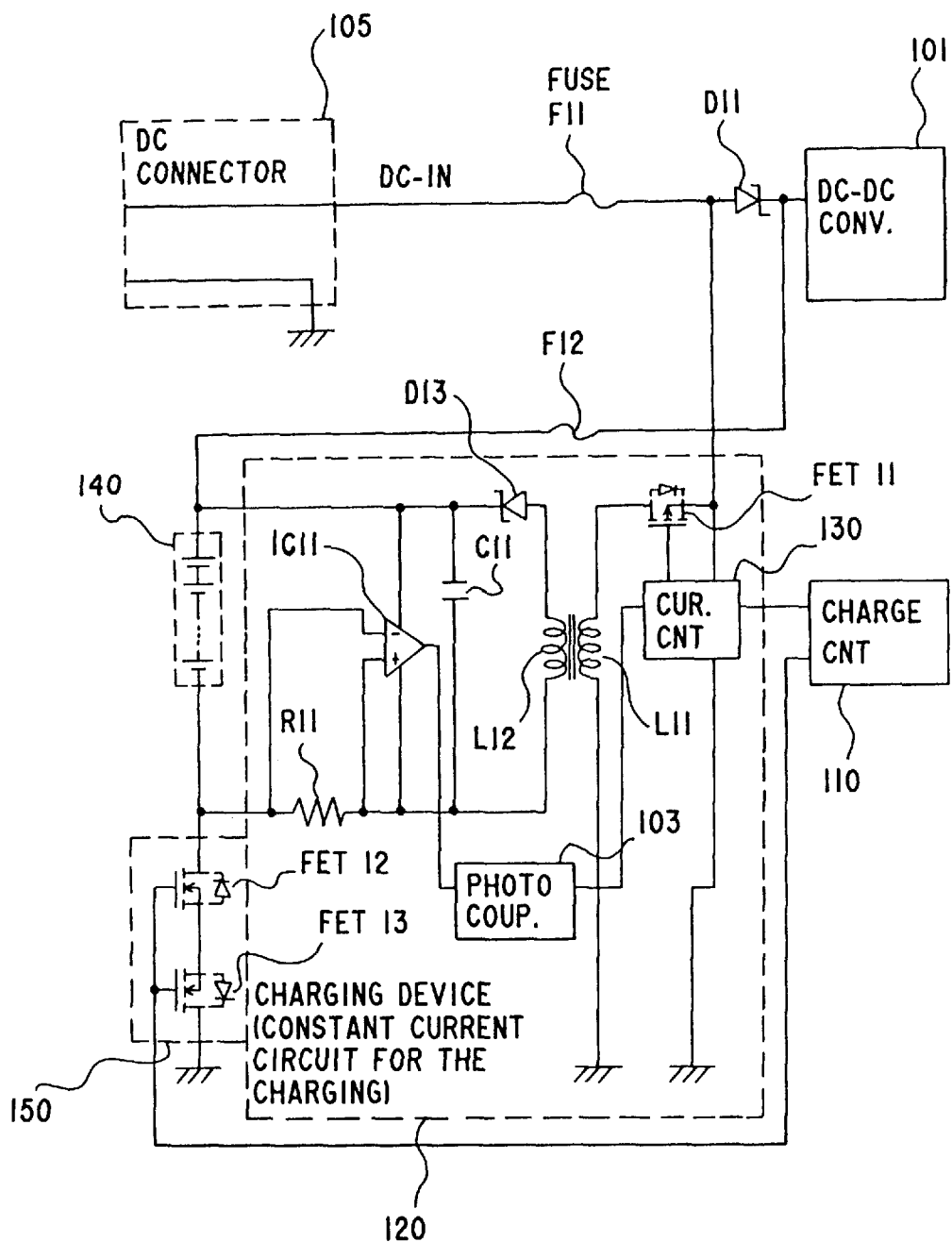
FIG. 12 shows a schematic diagram of a second embodiment of the charging-and-discharging device according to the present invention.

FIG. 12 shows a schematic diagram of a second embodiment of the charging-and-discharging device according to the present invention. In the first embodiment shown in FIG. 11, the mechanical contact of the DC connector 102 is used as the electrical switching circuit for separating the ground side of the apparatus and the negative terminal side of the battery. However, when the mechanical contact of the DC connector 102 cannot be used as shown in the DC connector 105 of FIG. 12, the separating and the connecting of the negative terminal of the battery and the ground of the apparatus are always carried out by the transistors FET12, FET13.

In this case, a contact resistance of the mechanical contact is around 20 mΩ, and an on-resistance of the FET switch is approximately 50 mΩ. Therefore, with 100 mΩ from two FETS, the efficiency is reduced. However, the efficiency is still several tens of times the efficiency of the diode, because Vf loss of the diode is larger.

Figure 13:
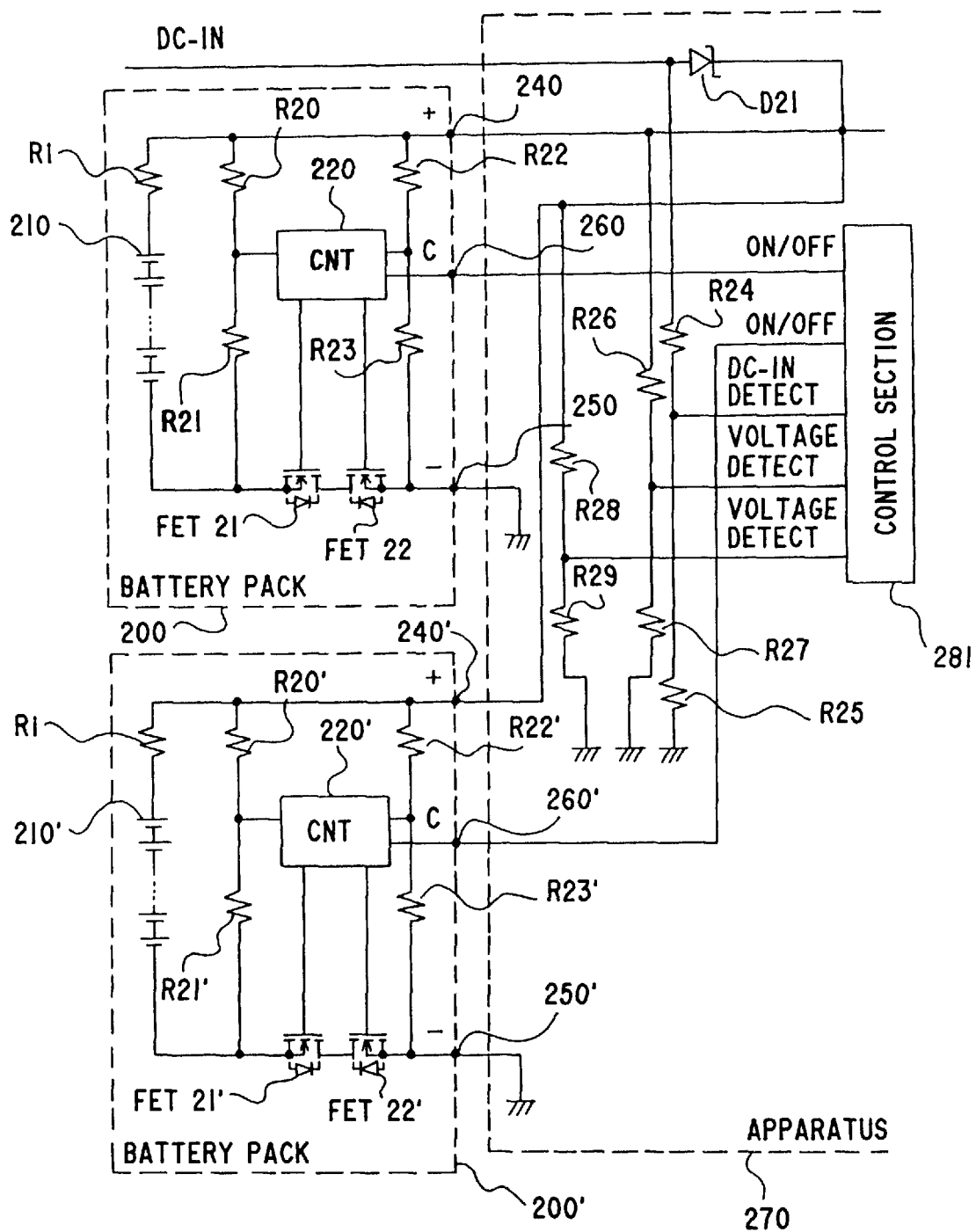
FIG. 13 shows a schematic diagram of a third embodiment of the charging-and-discharging control device according to the present invention.

Next, a description will be given of a third embodiment of the charging-and-discharging control device according to the present invention, by referring to FIG. 13. FIG. 13 shows a schematic diagram of the third embodiment of the charging-and-discharging control device according to the present invention.

The object of the third embodiment is to reduce the power loss due to the switching circuit in the apparatus for controlling the stopping/starting of the discharging. In the battery pack having the rechargeable secondary battery, the over-discharging prevention switching circuit for preventing the discharging of the battery is included. Further, the over-discharging prevention switching circuit can be externally controlled. Since the over-discharging prevention switching circuit can be turned off by the external control signal, the over-discharging prevention switching circuit may also be used for controlling the stopping/starting of the discharging from the battery.

The circuits shown in FIG. 13 are constructed with battery packs 200, 200' and an electronic power consuming apparatus 270. The battery packs 200, 200' include secondary batteries 210, 201', control sections 220, 220', positive terminals 240, 240', negative terminals 250, 250', and discharge control terminals 260, 260', respectively. The electronic apparatus 270 includes a control section 281 controlling the stopping/starting of the discharging in the apparatus 270. R20–R29 are resistors, FET21, FET22 are FETs forming the switching circuit, and D21 is a diode. The battery pack 200 (referenced to the battery A) has the same construction as that of the battery pack 200' (reference to the battery B).

The apparatus 270 shown in FIG. 13 operates by being supplied with the power from either of the two battery packs 200, 200' and from the external power supply (DC-IN) such as the AC adaptor.

The diode D21 is used for preventing the power from the battery from flowing back to the DC-IN side when the apparatus 270 is supplied with power from the battery A or the battery B. The resistors R24, R25 are used for detecting the voltage to determine whether or not the power from the DC-IN is supplied. The resistors R26, R27 are used for detecting the voltage to determine whether or not power from the battery A can be supplied. The resistors R28, R29 are used for detecting the voltage to determine whether or not power from the battery B can be supplied.

Now, the priority of supplying the power to the apparatus 270 is assumed as follows: a first priority is the DC-IN, a second is the battery A, and a third is the battery B. When the power supplied from the DC-IN is detected by the resistors R24, R25, the control section 281 turns off the over-discharging prevention transistors FET21, FET22, etc., by transmitting an off signal to the C terminals (discharge control terminals 260, 260') of the batteries A, B. Thereby, the power from the DC-IN is prevented from flowing back to the battery A or the battery B, and consumption of battery power due to the batteries A, B supplying power may be prevented.

When a stoppage of the power supply from the DC-IN is detected by the resistors R24, R25, the control section 281 transmits an on signal to the discharge control terminal (C terminal) 260 of the battery A to start discharging the battery A. After the transistors FET21, FET22 are turned on, the power supply from the battery A is started. At this time, to prevent the power of the battery B from being discharged, the control section 281 transmits the off signal to the discharge control terminal (C terminal) 260' of the battery B to maintain the transistors FET21', FET22' at the off state. In this case, if the control section 281 transmits the on signal to the battery B, both the battery A and the battery B may simultaneously supply power to the apparatus 270.

When the resistors R26, R27 detects that the discharging of the battery A is completed and the secondary battery 210 is fully discharged, the control section 281 transmits the on signal to the C terminal (discharge control terminal 260') of the battery B to start discharging the battery B. Then, the transistors FET21', FET22' in the battery B are turned on and the power supplying from the battery B is started. At the same time, the control section 281 transmits the off signal to the C terminal (discharge control terminal 260) of the battery A to turn off the transistors FET21, FET22. Thereby, the over discharging of the battery A is prevented, and the back current from battery B to the battery A is also prevented.

Figure 14:
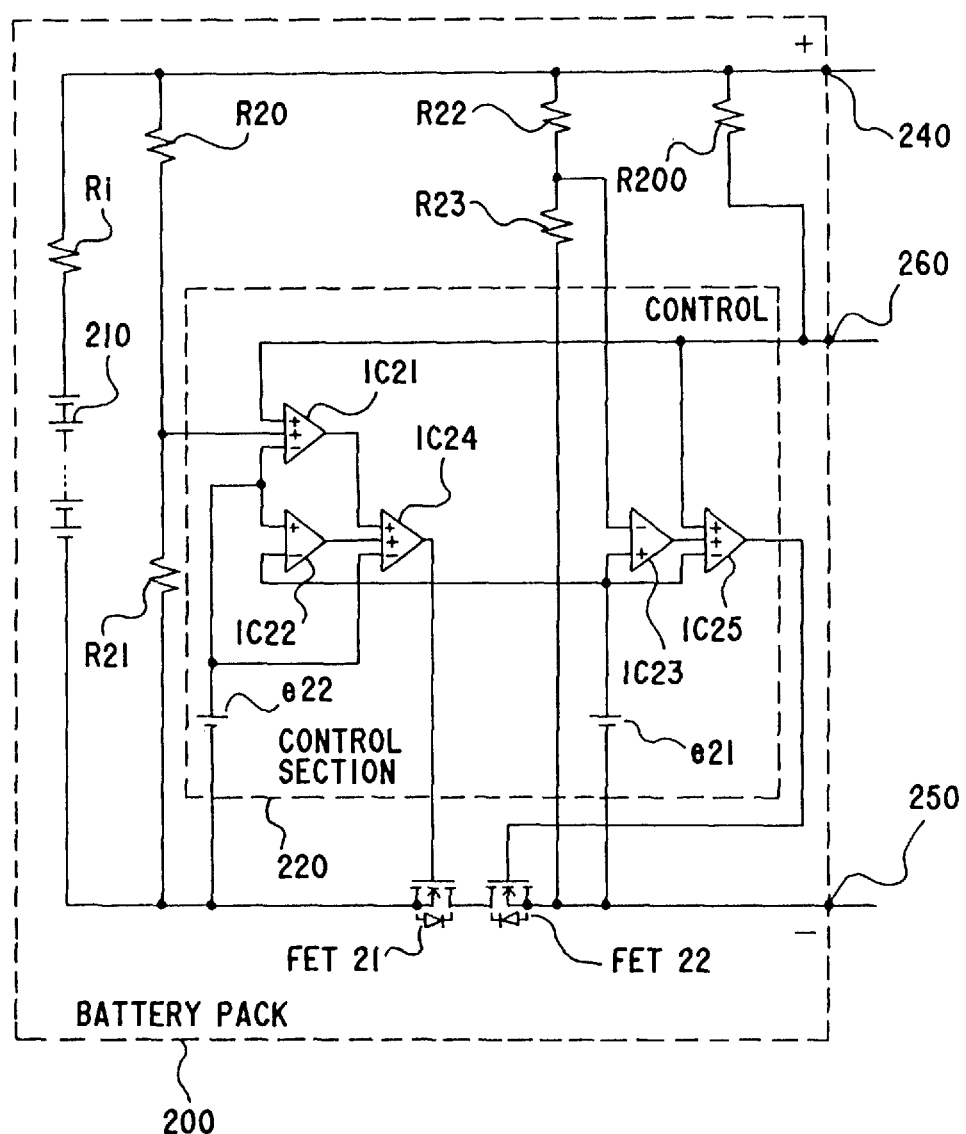
FIG. 14 shows a detail schematic diagram of the over-discharging prevention control circuit in the battery pack shown in FIG. 13.

FIG. 14 shows a detail schematic diagram of the over-discharging prevention control circuit in the battery pack shown in FIG. 13. In FIG. 14, the transistor FET21 is the switching circuit for opening the circuit when the battery is in the over-discharging state (the battery voltage having dropped below an given voltage) and over current flows from the battery by a short circuit of the load, and when the discharging from the battery is stopped by the signal from the discharge control terminal (C terminal) 260. The transistor FET21 is turned on and off by the comparators (error amplifiers) IC21, IC22.

The transistor FET22 is the switching circuit for opening the circuit to protect the battery when the charged voltage is increased above the given value, and for stopping charging the battery when the charging of the battery is prohibited by the signal from the C terminal. The transistor FET22 is turned on and off by the comparators IC23, IC25.

The comparator IC21 is a 3-input comparator for comparing the battery voltage detected by the resistors R20, R21 with the reference voltage e22. When the battery voltage drops by the discharging of the battery below the reference voltage e22, or when the low level is input from the discharge control terminal 260, the comparator IC21 produces the low level to turn off the transistor FET21 through the comparator IC24. Thus, the comparator IC21 provides the over-discharging prevention circuit.

When there is no input in the discharge control terminal 260, the positive terminal 240 of the comparator IC21 is maintained at the high level by the resistor R200, which is the same operation as that of the conventional circuit. When the low level is applied to the discharge control terminal 260, the comparator IC21 produces the low level regardless of the voltage of the battery and turns off the transistor FET21.

In the above description, to simplify the description of the over-discharging prevention circuit, the circuit IC21 has been considered as a comparator. In practical use, to suppress a fluctuation of an output of the comparator IC21 which is caused by a fluctuation of the battery voltage due to an internal resistance Ri of the battery, the battery pack may include a flip-flop (FF) circuit for storing data that the comparator IC21 produces at the low level, and reset means for resetting the storage data of the flip-flop circuit when the battery voltage is restored by the charging, etc. When the discharging is controlled by the input from the discharge control terminal 260, the FF storing the low level does not need to be controlled.

When an over current flows from the battery due to load short-circuiting, the comparator IC22 is used for detecting the over current to protect the battery from the short circuit by opening the circuit. Measurement of the over current is carried out by measuring the voltage drop across the transistors FET21, FET22 provided as the switching circuit. When the over current flows by the load short-circuiting, a potential at the negative terminal of the battery pack 200 is increased in proportion to the current value by the on resistances of the transistors FET21, FET22. At this time, a potential of the reference voltage e21 is also increased. Therefore, when a current larger than a given value flows, the comparator IC22 comparing the potentials of the reference voltages e21, e22 produces the low level, and turns off the transistor FET21 through the comparator IC24.

In the above description, to simplify the description of the over current prevention circuit, the circuit IC22 has been considered as a comparator. In practical use, when the transistor FET21 is turned off, the output of the comparator IC22 is immediately returned to the high level. To prevent a variation of the output of the comparator IC22, the battery pack may include a flip-flop (FF) circuit for storing data that the comparator IC22 produces at the low level, and reset means for resetting the storage data of the flip-flop circuit when the short-circuit state is restored.

The comparator IC24 is a three-input comparator. When both of the inputs from the comparators IC21, IC22 are respectively higher than the reference voltage e22, the comparator IC24 produces the high level to turn on the transistor FET21. As mentioned above, when the battery is in the over-discharging state or when the over current flows from the battery by the short circuit, the transistor FET21 is turned off to open the circuit by the comparators IC21, IC22, IC24.

The comparator IC23 is an over-voltage detecting circuit to prevent a voltage higher than a specified voltage from being applied to the battery during charging. The comparator IC23 compares the charging voltage measured by the resistors R22, R23 with the reference voltage e21. As a result of the comparison, when the charging voltage is higher than the specified voltage, the comparator IC23 produces the low level.

The comparator IC25 is a three-input comparator. When both the input from the comparator IC23 and the input from the discharge control terminal 260 is higher than the reference voltage e21, the comparator IC25 produces the high level to turn on the transistor FET25. When either of the inputs is lower than the reference voltage e21, the comparator IC25 produces the low level to turn off the transistor FET22, and intercepts the current flow for the charging.

Accordingly, when the low level is supplied to the discharge control terminal 260, the transistor FET22 is unconditionally turned off, and charging of the battery is stopped. When there is no input in the discharge control terminal 260, the positive terminal 240 of the comparator IC25 is maintained at the high level by the resistor R200. Therefore, in the same way as the conventional circuit, the transistor FET22 is turned on and off by only the output of the comparator IC23.

When the battery is in the over-discharging state and the transistor FET21 is in the off state, if the charging voltage is applied to the positive terminal 240 of the battery, the transistor FET21 does not intercept the current flow by the parasitic diode and, the battery is charged. When the potential of the battery is raised by the charging of the battery, the potential detected by the resistors R20, R21 exceeds the reference voltage e22 and the comparator IC21 produces the high level. At this time, a direction of the current flow through the transistors FET21, FET22 is opposite at the discharging. Therefore, the potential of the reference voltage e21 does not exceeds the potential of the reference voltage e22, and the comparator IC22 also produces the high level. As a result, the comparator IC24 turns on the transistor FET21.

When the off signal is applied to the discharge control terminal 260, both transistors FET21, FET22 are turned off. Therefore, both charging and discharging are prohibited. On the contrary, when the on signal is applied to the discharge control terminal 260, or when the discharge control terminal 260 is maintained at the open state, the transistors FET21, FET22 operate as the over-discharging prevention circuit without being controlled by the discharge control terminal 260 as the conventional circuit.

Figure 4:
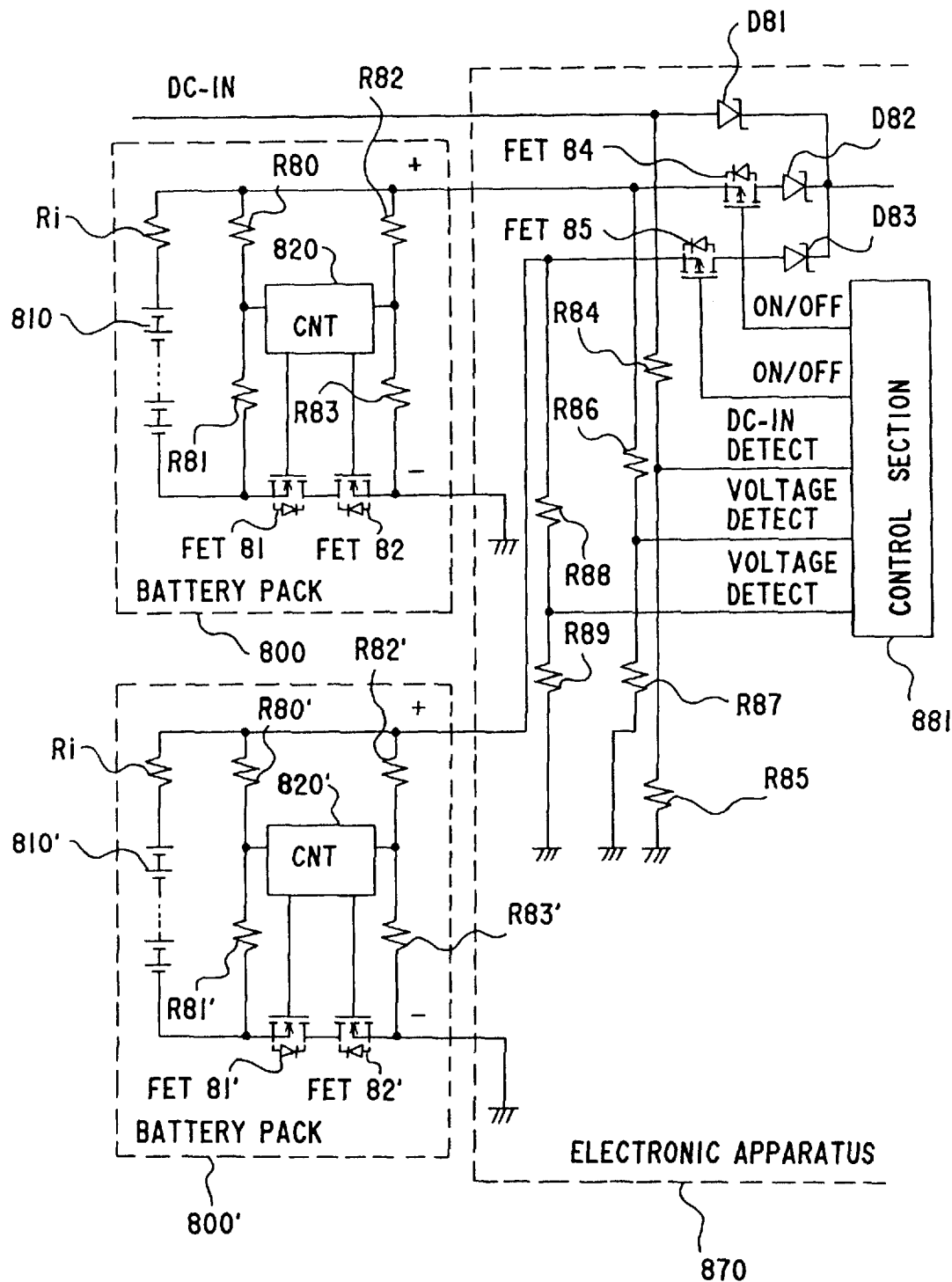
FIG. 4 shows a schematic diagram of a conventional over-discharging prevention circuit for a battery.
Figure 5:
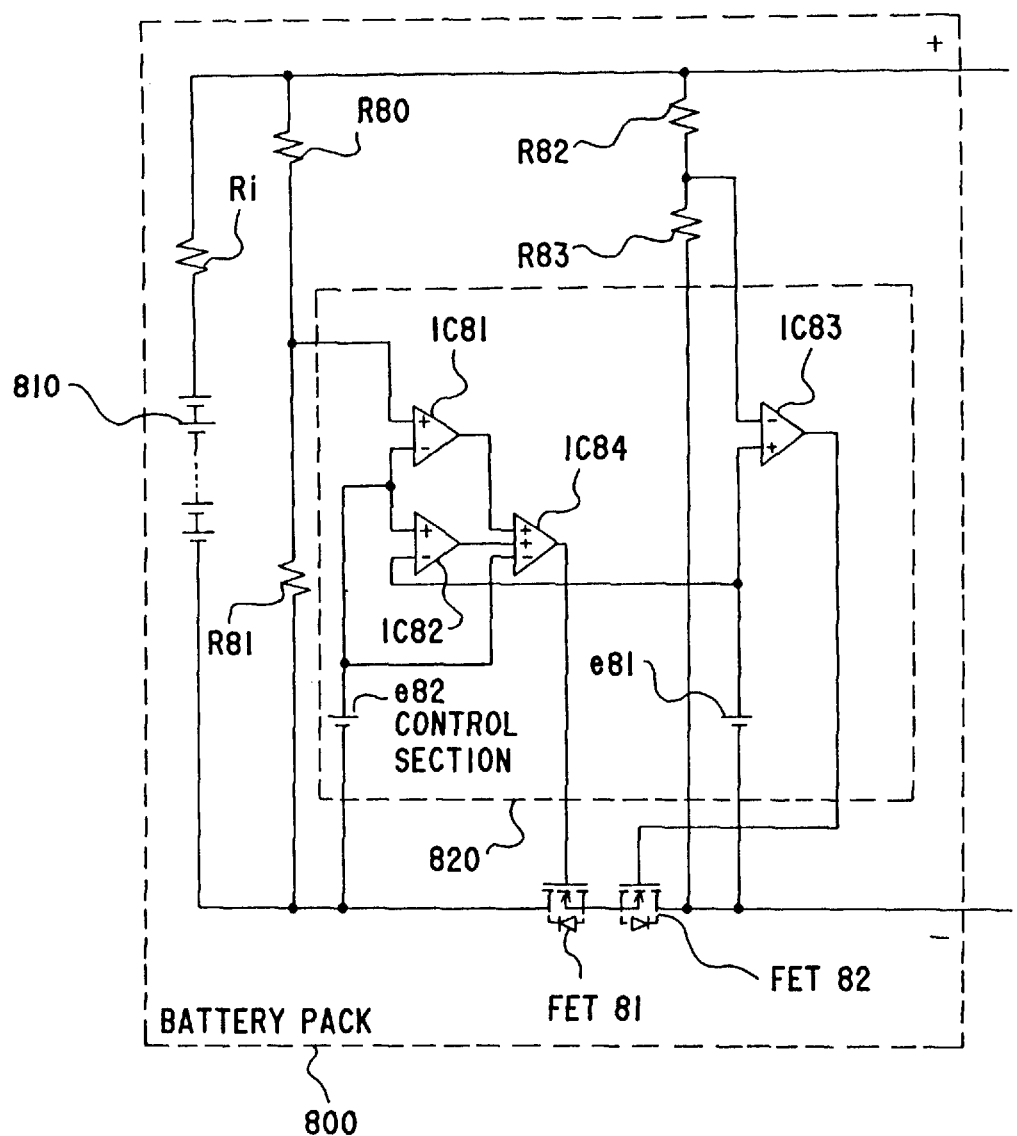
FIG. 5 shows a detail schematic diagram of the over-discharging prevention circuit in the battery pack 800 shown in FIG. 4.
Figure 6:
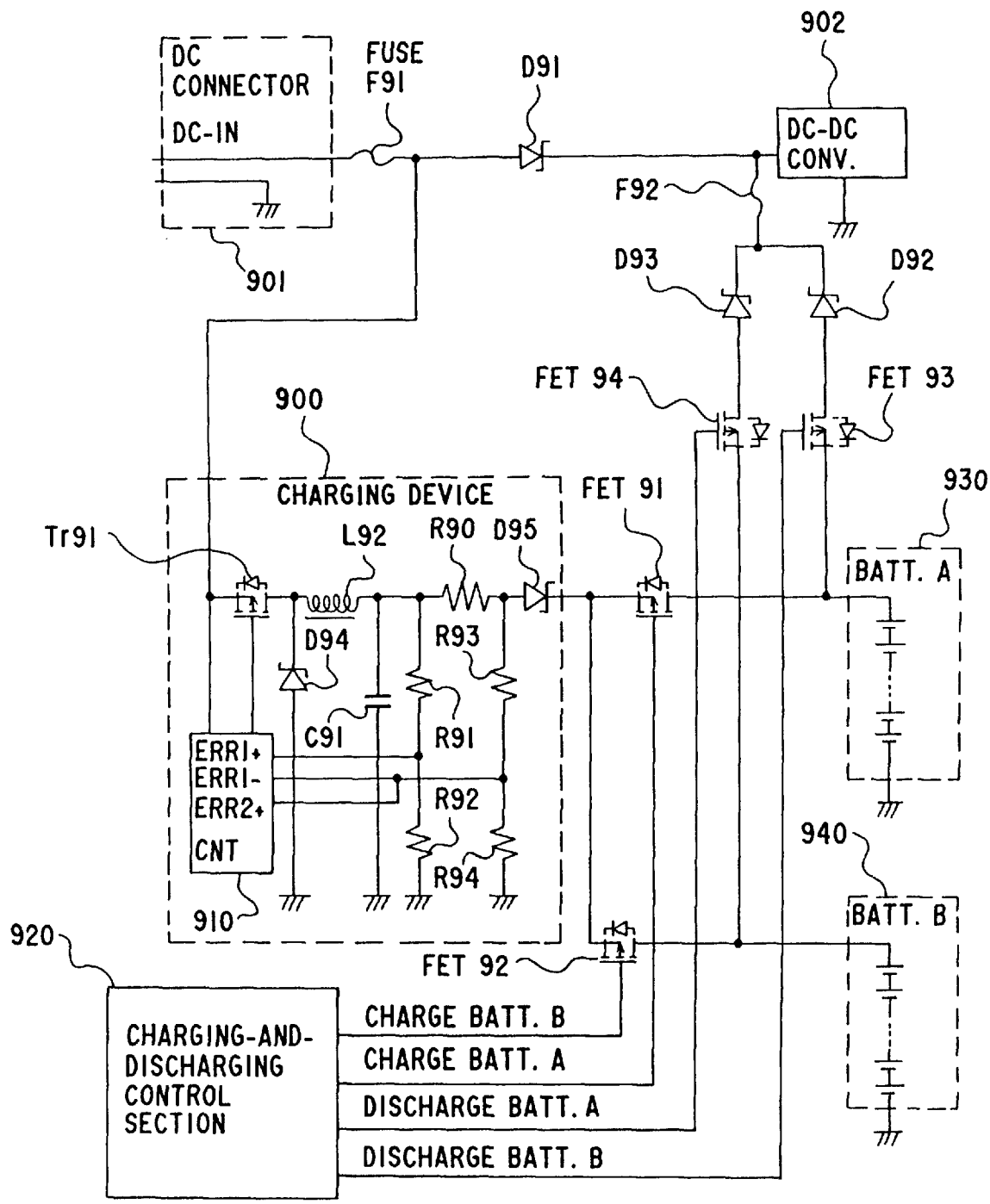
FIG. 6 shows a schematic diagram of a conventional charging device mounting two battery packs.
Figure 8:
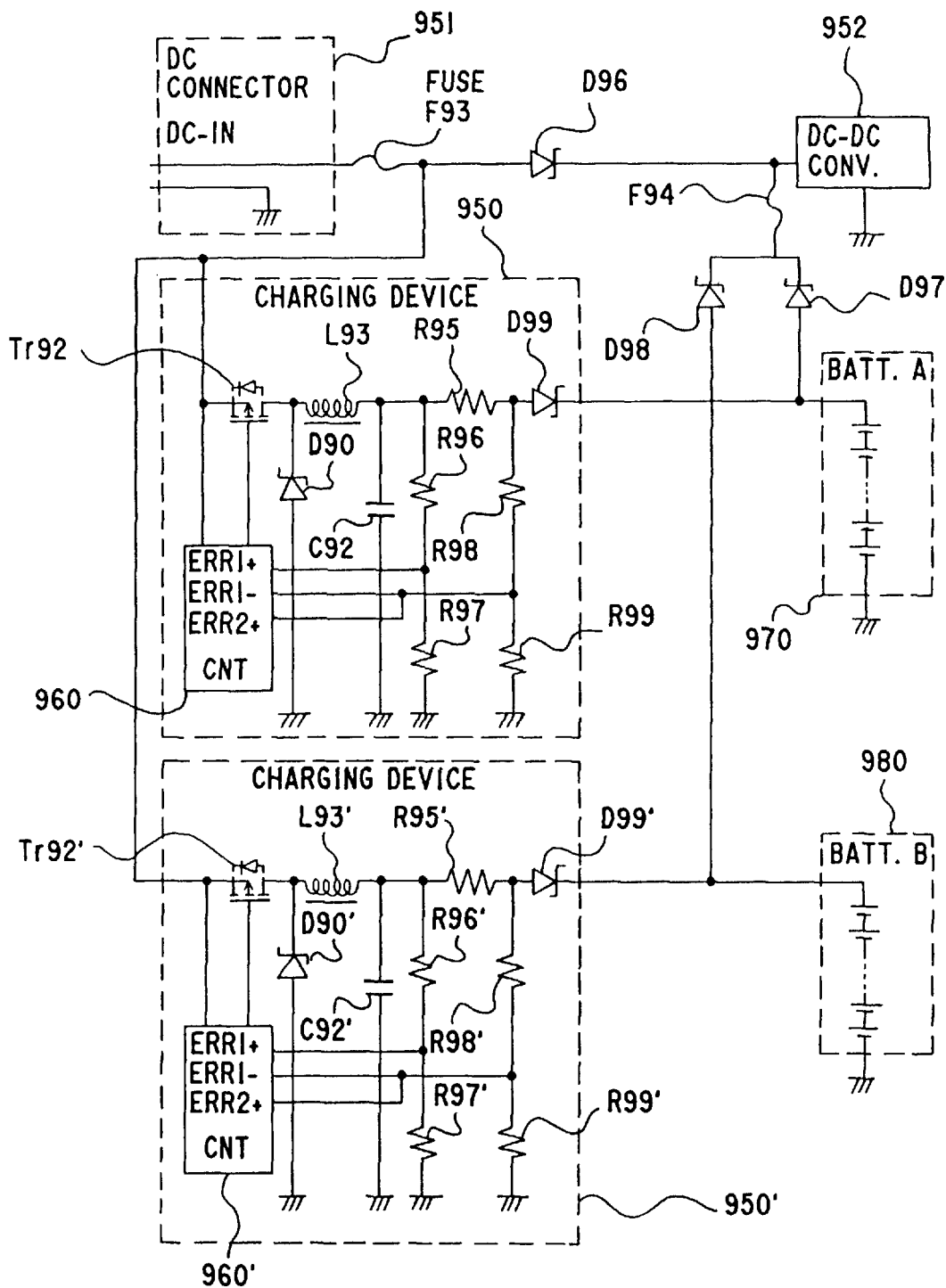
FIG. 8 shows a schematic diagram of a conventional charging apparatus having the same number of charging devices as batteries.

As mentioned above, in the third embodiment, the over-discharging prevention switching circuit provided in the battery pack can be also used by a control from the apparatus. The transistors (transistors FET84, FET85 shown in FIG. 4), which are located in the conventional apparatus, for controlling the charging order are eliminated. The diodes (diodes D82, D83 shown in FIG. 4) for preventing the DC-IN input from flowing back to the battery are also eliminated. Therefore, the power loss due to these transistors and diodes is reduced to zero. This reduction enables more effective operation of the battery.

Next, descriptions will be given of a fourth embodiment of the charging-and-discharging device and an embodiment of a constant-voltage-and-constant-current control circuit according to the present inventions.

In the constant current circuit for the charging of the secondary battery, a plurality of voltages can be applied to voltage detection inputs of the voltage controlling error amplifier of the constant current control circuit. Further, the plurality of current measuring error amplifiers are provided in the constant-voltage-and-constant-current circuit. By the constant-voltage-and-constant-current circuit, even if a constant current circuit is single, the plurality of secondary batteries can be charged in parallel. Since the plurality of secondary batteries are charged in parallel by using the constant-voltage-and-constant-current circuit, the switching circuit for controlling the current paths between the constant current circuit and the plural secondary batteries may be eliminated.

Figure 15:
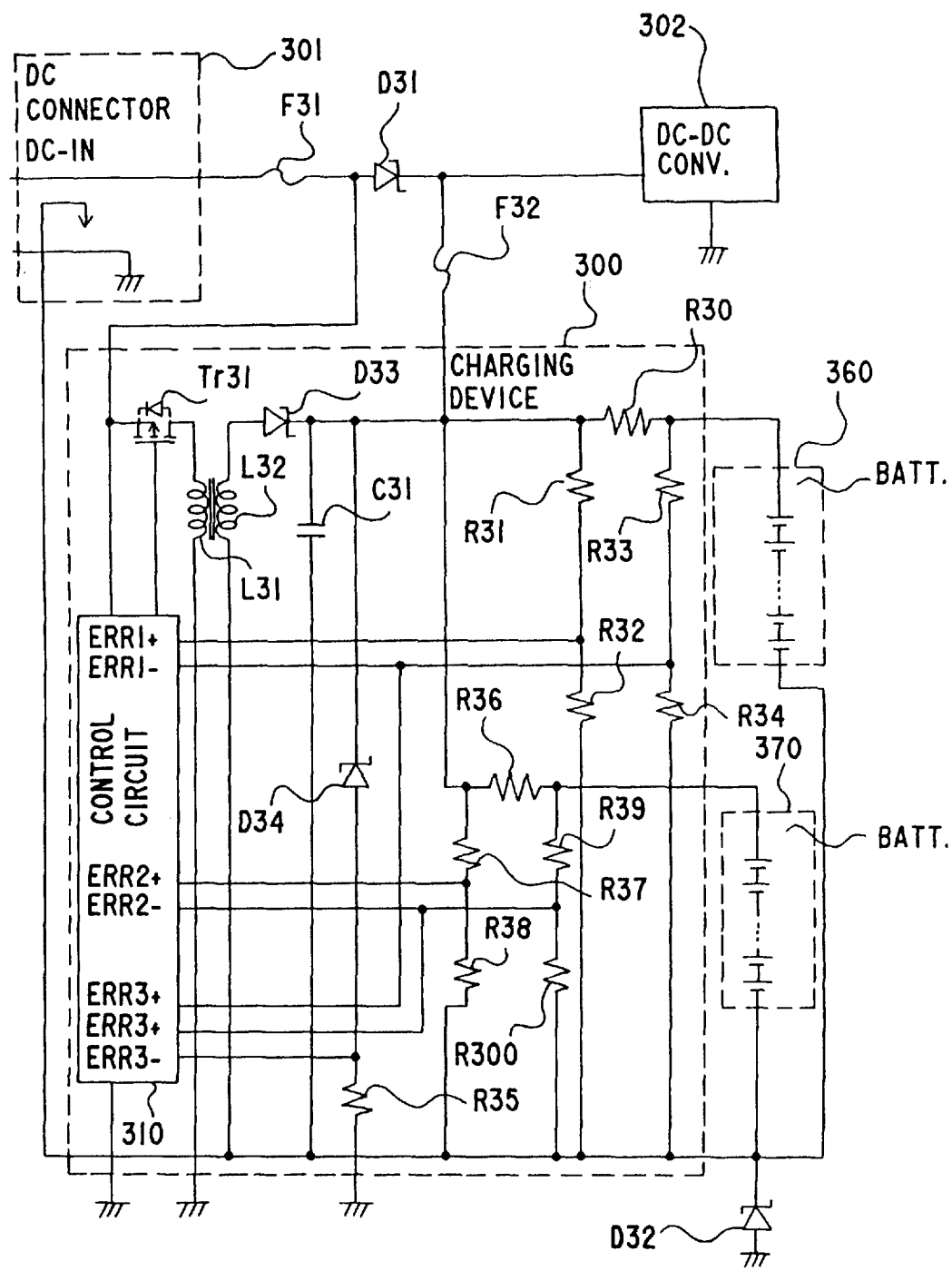
FIG. 15 shows a schematic diagram of a fourth embodiment of the charging-and-discharging device according to the present invention.
Figure 16:
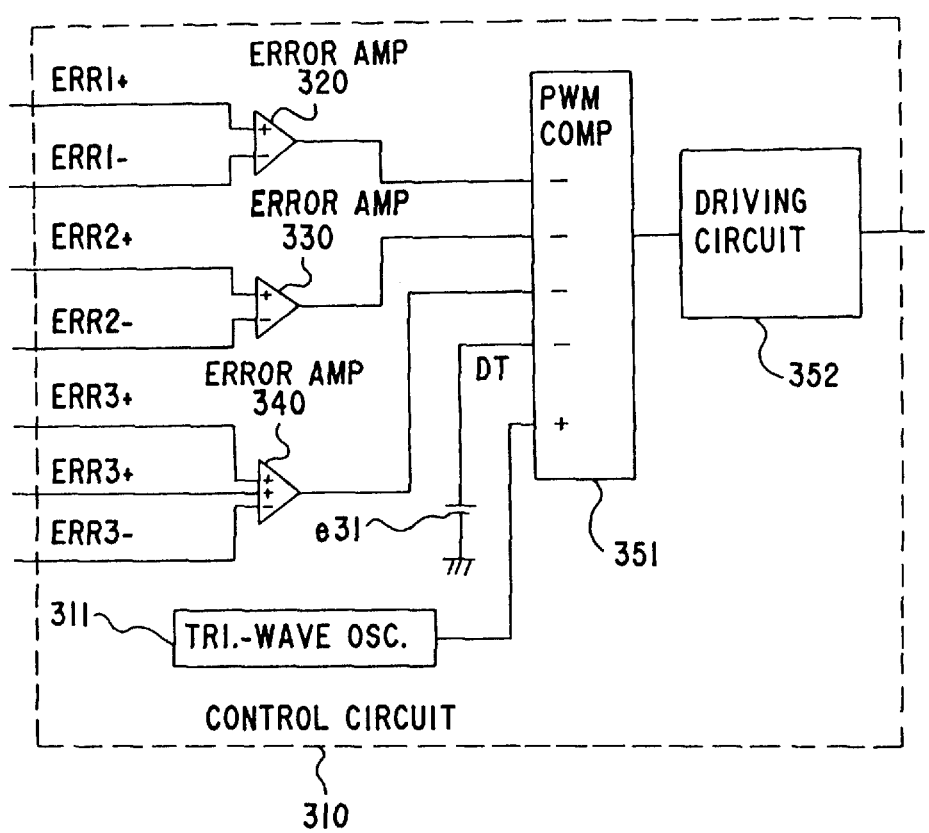
FIG. 16 shows a block diagram of an embodiment of the constant-voltage-and-constant-current control circuit according to the present invention.

FIG. 15 shows a schematic diagram of the fourth embodiment of the charging-and-discharging device according to the present invention. FIG. 16 shows a block diagram of the embodiment of the constant-voltage-and-constant-current control circuit according to the present invention.

In FIG. 15, there is shown a charging device 300, a DC connector 301, a DC to DC converter 302, and battery packs of the secondary batteries 360, 370 (referenced to a battery A, a battery B, respectively). The charging device 300 includes a control circuit 310 for performing the constant current control. Tr31 is a transistor, D31–D34 are diodes, F31, F32 are fuses, L31/L32 is a transformer, C31 is a capacitor, and R30–R300 are resistors. In FIG. 16, there is shown a triangular-wave oscillator 311, error amplifiers 320, 330, 340, a PWM comparator 351, and a driving circuit 352.

The DC connector 301 is used for supplying external power when the apparatus is operated with the external power source such as the AC adaptor, or when the built-in secondary battery in the apparatus is charged. The DC to DC converter 302 is the power source for the apparatus, and is used for generating the voltage required for the apparatus by being supplied with the external power source from the DC connector 301 or the power supplied from the built-in secondary batteries.

The DC connector 301 has mechanical contact on the ground side. When the AC adaptor is in a disconnection state, the negative terminal side of the battery is connected to the ground of the apparatus by the mechanical contact. When the AC adaptor is in a connection state, the negative terminal side of the battery is isolated from the ground of the apparatus by the mechanical contact to prevent the battery from being charged.

When the AC adaptor, etc., is connected to the DC connector 301, if the AC adaptor is deactivated for a reason such as the AC power source is not supplied to the AC adaptor, the diode D31 prevents the power of the built-in secondary batteries from flowing out. The diode D31 is a back-current-block protection diode.

When the AC adaptor is connected to the DC connector 301, but no AC input is supplied to the AC adaptor, the diode D32 is used for the power supplied to the DC to DC converter 302 from being intercepted. The diode D32 is the diode for preventing the instantaneous disconnection.

The charging device 300 is the constant current circuit for charging which operates in a PWM control method. The transistor Tr31 is the main transistor for the switching, and is turned on and off by the control circuit 310. The transformer L31/L32 is the transformer for voltage transforming. The diode D33 is the rectifying diode. The resistors R33, R34 are used for detecting the charging voltage to the battery A, and the resistors R39, R300 are used for detecting the charging voltage to the battery B. Both the voltage detected by the resistors R33, R34 and the voltage detected by the resistors R39, R300 is applied to the control circuit 310. The diode D34 is a Zenner diode and generates the reference voltage by cooperating with the resistor R35.

The resistor R30 is the sense resistor for measuring the current value provided to the battery A. The voltage drop which is caused by the current flowing through the sense resistor is divided by the resistors R31, R32, and the resistors R33, R34. The divided voltages are supplied to the error amplifier in the control circuit 310. The resistor R36 is the sense resistor for measuring the current value provided to the battery B. The voltage drop which is caused by the current flowing the sense resistor is divided by the resistors R37, R38, and the resistors R39, R300. The divided voltages are supplied to the error amplifier in the control circuit 310.

FIG. 16 shows a detail schematic diagram of the control circuit 310 of the constant current charging device using the PWM control method shown in FIG. 15. The control circuit 310 comprises the triangular oscillator 311, the plural current measuring error amplifiers 320, 330, the single voltage controlling error amplifier 340 having a plurality of voltage inputs, the PWM comparator 351, and the driving circuit 352.

The error amplifiers 320, 330 detect output currents of the constant current circuit and produce PWM control signals. The error amplifier 340 compares a plurality of input voltages with the reference voltage e31, and amplifies a difference between a maximum value of the input voltages and the reference voltage e31.

The PWM comparator 351 is a voltage comparator having a plurality of inversion inputs and one non-inversion input, and operates as a voltage-pulse-width converter which controls the on time in the output pulse width according to the input voltages. When the triangular wave from the triangular oscillator 311 is higher than both of the output voltages of the error amplifiers and the voltage defined in the DT terminal, the PWM comparator 351 turns on the driving circuit 352, thereby the output transistor Tr31 is turned on.

The driving circuit 352 is a driver for driving the main transistor Tr31. It is operated to drive and turn on the transistor Tr31 when the output of the PWM comparator 351 is in the on state.

The triangular oscillator 311 oscillates the triangular wave for converting the voltage to the pulse width at a constant frequency.

This constant current circuit is the constant-voltage-and-constant-current control circuit operating in the PWM method, whose operation is somewhat similar to that of the conventional constant current circuit in the PWM method. Different points are as follows: (1) this constant current circuit has a plurality of current measuring error amplifiers, and (2) the voltage controlling error amplifier has a plurality of voltage inputs.

In FIG. 16, the PWM comparator 351 compares the outputs of the error amplifiers 320 to 340 and the input voltage of the DT terminal with the output of the triangular oscillator 311. Only when the output voltage of the triangular oscillator 311 is higher than both of the output voltages of the amplifiers 320 to 340 and the input voltage of the DT terminal, the PWM comparator 351 turns on the driving circuit 352, thereby the transistor Tr31 is turned on.

Therefore, for the inputs from the current measuring error amplifiers 320, 330, the control circuit 310 is operated based on the current value restricted by the error amplifier having a larger current. In the same way, since the voltage controlling error amplifier is controlled by the maximum input voltage, the control circuit 310 is also controlled based on the maximum voltage of the plurality of inputs.

As mentioned above, in the constant-voltage-and-constant-current control circuit shown in FIG. 16, a plurality of current measuring error amplifiers are provided, and in the voltage controlling error amplifier, a plurality of voltage inputs are provided for the voltage detection input. Therefore, the constant-voltage-and-constant-current circuit is operated with the current value and the voltage value restricted by the error amplifier in which one of the plurality of inputs initially reaches the restricted value.

When the plural secondary batteries are charged in parallel by using the constant-voltage-and-constant-current circuit, each of the batteries connected in parallel is charged within the restricted current. Each of the batteries connected in parallel may be charged within the restricted voltage.

Next, a further detail description will be given of the parallel charging of the battery.

When the AC adaptor, etc., is connected to the DC connector 301 and external power is supplied, the external power is applied to the DC to DC converter 302 through the diode D31. The DC to DC converter 302 generates the voltage required for the apparatus. In this case, the power supplied from the external power source is applied to the positive terminal side of the secondary battery, however, no power is supplied to the negative terminal side of the secondary battery since the negative terminal is isolated from the ground of the apparatus (equal to the negative electrode of the external power source) by the contact circuit in the DC connector 301.

When external power is supplied, and when the constant current circuit for the charging generates the power for charging by the instruction from the charge control section, the power is supplied to the secondary battery to be charged. When the constant current circuit for the charging operates, the power supplied from the external circuit is converted to the alternating-current (AC) signal through the main switching transistor Tr31. The converted AC signal is applied to the L31 side of the transformer, and is transferred to the L32 side. The voltage transferred to the L32 side is converted to the direct current (DC) signal by the rectifying diode D33. The DC signal is applied to the positive terminals of the batteries A, B.

The current value flowing through the battery A is measured by the current sense resistor R30. The voltage across the sense resistor R30 is divided by the resistors R31, R32 and the resistors R33, R34. The divided voltages are applied to the error amplifier 320 of the control circuit 310 in the constant current circuit, which controls the current flowing through the battery A not to exceed the maximum value of the given currents. In the same way, the current value flowing through the battery B is measured by the current sense resistor R36. The voltage across the sense resistor R36 is divided by the resistors R37, R38 and the resistors R39, R300. The divided voltages are applied to the error amplifier 330 of the control circuit 310 in the constant current circuit, which controls the current flowing through the battery B not to exceed the maximum value of the given currents.

The voltage applied to the battery A is measured by the voltage sense resistors R33, R34. The measured voltage is applied to the error amplifier 340 of the control circuit 310 in the constant current circuit, which controls the voltage applied to the battery A not to exceed the maximum value of the given voltages. In the same way, the voltage applied to the battery B is measured by the voltage sense resistors R39, R300. The measured voltage is applied to the error amplifier 340 of the control circuit 310 in the constant current circuit, which controls the voltage applied to the battery B not to exceed the maximum value of the given voltages.

The current from the constant current circuit for the charging is applied to the battery A and the battery B through the diode D33. Since the negative terminal sides of the battery A and the battery B are isolated from the ground of the apparatus by the contact circuit of the DC connector 301, the current generated in the constant current circuit flows through only the battery A and the battery B. Further, though the positive terminal side of the constant current circuit for the charging is connected to the positive potential side of the apparatus, the negative potential side of the constant current circuit is connected to only the negative terminals of the batteries. Therefore, the constant current circuit does not affect the positive potential of the apparatus.

When the constant current circuit for the charging is deactivated by the instruction or command of the charge control section, the input power is not transferred to the L32 side since the transistor Tr31 is maintained in the off state. Since the diode D33 is connected to the battery in the opposite direction, the current of the battery is not discharged through the L32 side of the transformer.

When the external power supplying is stopped by, for example, pulling the AC adaptor from DC connector 301, since the positive terminal of the secondary battery is directly connected to the DC to DC converter 302 and the negative terminal of the secondary battery is connected to the ground of the apparatus through the contact of the DC connector 301, the voltage of the secondary battery is directly transferred to the DC to DC converter 302. The diode D31 prevents the power from the secondary battery from flowing into any circuit except the DC to DC converter 302.

Though the AC adaptor, etc., is connected to the DC connector 301, the AC adaptor is deactivated when the AC adaptor is not provided with the AC power source. In this case, when the negative terminal side of the secondary battery is not directly connected to the ground of the apparatus through the contact of the DC connector 301, the negative terminal side of the secondary battery and the ground side of the apparatus are connected through the diode D32.

As mentioned above, in the fourth embodiment, the plurality of secondary batteries can be charged in parallel by a single constant current circuit. Since the switching circuits for controlling the current paths between the constant current circuit and the plurality of secondary batteries are removed, the power loss due to the voltage drop across the switching circuit during discharging of the battery may be eliminated. This elimination improves the efficiency of the battery use.

Next, a description will be given of a fifth embodiment of the charging-and-discharging device according to the present invention.

In the fifth embodiment, the paths between the one charging circuit and the plurality of secondary batteries are time-divisionally switched by the switching circuit, and thereby, the plurality of batteries may be simultaneously charged. Since the plurality of secondary batteries is charged in parallel by the single constant current circuit, the parallel discharging of the plurality of secondary batteries becomes possible. Further, to individually manage the charging current for the plural batteries by the single constant current circuit, the plural secondary batteries are time-divisionally charged. Therefore, in a macroscopic time interval, the parallel charging for the plural secondary batteries is realized.

Figure 17:
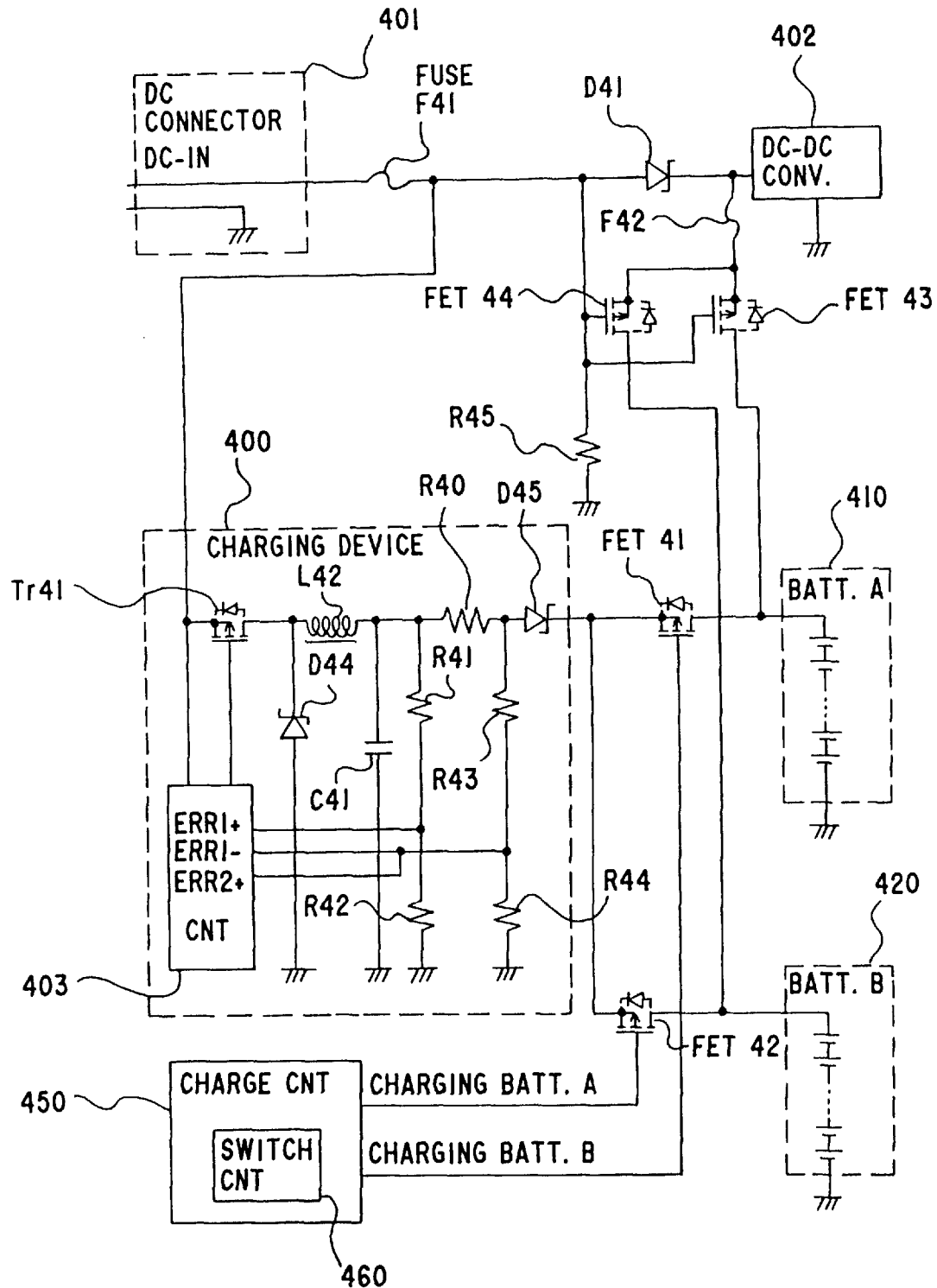
FIG. 17 shows a schematic diagram of a fifth embodiment of the charging-and-discharging device according to the present invention.

FIG. 17 shows a schematic diagram of the fifth embodiment of the charging-and-discharging device according to the present invention. In FIG. 17, there is shown a charging device 400, a DC connector 401, a DC to DC converter 403, battery packs of the secondary batteries 410, 420 (referenced to as battery A, battery B, respectively), and a charge control section 450. The charging device 400 includes a control section 403 carrying out the constant current control. The charge control section 450 includes switching control means 460. Tr41, FET41–FET44 are transistors, D41, D44, D45 are diodes, F41, F42 are fuses, L42 is a choke coil, C41 is a smoothing capacitor, and R40–R45 are resistors.

The DC connector 401 is used for supplying external power when operating the apparatus with the external power source through the AC adaptor, etc., or when charging the built-in secondary batteries. The DC to DC converter 402 is used to generate the voltage required for the apparatus from the external power source supplied through the DC to DC connector 401 or from the power of the built-in secondary batteries.

The charging device 400 is the constant current power source for generating the power required for charging the secondary batteries when external power is supplied through the DC connector 401.

When the AC adaptor, etc., is connected to the DC connector 401, if the AC adaptor is deactivated for such reason as the AC power source is not supplied to the AC adaptor, the diodes D41, D45 prevents the power of the built-in secondary batteries from discharging. The diodes D41, D45 are back-current-block protection diodes.

The transistors FET43, FET44 are used for supplying power from the secondary batteries to the DC to DC converter 402. Further, the transistors FET43, FET44 are P-type DMOS-FETs and are the switching circuits operating as protection diodes to prevent the external power from being supplied to the secondary batteries when the external power is supplied through the DC connector 401.

The resistor R45 is the voltage detection resistor for detecting the external power through the DC connector 401 and controlling the on and off state of the transistors FET43, FET44.

The transistors FET41, FET42 are the switching circuits for selecting the battery to be charged and controlling the charging current supplied from the charging device 400 to flow through either the battery A and the battery B. These switching circuits are time-divisionally turned on and off repeatedly by the switching control means 460 of the charging control section 450 during the constant current circuit operates.

The charging device 400 is the constant current circuit for charging, and is constructed with the main switching transistor Tr41, the choke coil L42, the flywheel diode D44, the smoothing capacitor C41, the current controlling sense resistors R40 to R45, and the control section 403. The constant current circuit for charging has the same configuration as that of the conventional switching regulator, etc.

When the AC adaptor, etc., is connected to the DC connector 401 for external power, the external power is applied to the DC to DC converter 402 through the diode D41. The DC to DC converter 402 generates the voltage required for the apparatus. Source electrodes of the transistors FET43, FET44 are connected to a cathode side of the diode F41, and drain electrodes thereof are connected to the positive terminal side of the battery A or the battery B. Gate electrodes of the transistors FET43, FET44 are connected to an anode of the diode D41, and are connected to the ground through the resistor R45.

When the voltage is applied to the DC-IN, the voltage at the DC-IN is applied to the gates of the transistors FET43, FET44, thereby both of which are turned off. Since the internal parasitic diodes in the transistors FET43, FET44 are oriented in the forward direction from the drain side to the source side, the internal parasitic diodes assume a reverse bias state by the DC-IN input. Therefore, the DC-IN input is intercepted by the transistors FET43, FET44 and is not applied to the secondary batteries.

When the DC-IN is switched to the off state and the external power is stopped, the power of the battery A and the battery B is supplied to the DC to DC converter 402 by the internal parasitic diodes in the transistors FET43, FET44. At the same time, since the gate electrodes of the transistors FET43, FET44 are connected to the ground by the resistor R45, the negative voltage to the source potential is applied to the gates, and these transistors are turned on. When the transistors FET43, FET44 are turned on, the discharge from both battery A and battery B starts.

When the transistors FET43, FET44 are turned on, the positive terminals of the battery A and the battery B are connected to each other in parallel. If the battery A and the battery B has been charged in the same capacity, no charging and discharging occurs between the battery A and the battery B.

The on resistance of the transistors FET43, FET44 may be reduced to less than 100 mΩ. Therefore, though the voltage drop in the forward direction in the diode is 0.35 V to 0.55 V, the power loss in the transistors FET43, FET44 as the switching circuit may be reduced from to one to several times that of the loss in the diode.

The diode D41, D45, presents the power from the battery from flowing into any of the circuits except the DC to DC converter 402.

When external power is supplied, and when the constant current circuit for the charging operates and generates power for the charging, the power is supplied to the secondary batteries to be charged. When the constant current circuit for the charging is deactivated, no power is supplied to the batteries since the transistor Tr41 is turned off.

When external power is supplied through the AC adaptor and the constant current circuit for the charging operates, the power generated in the charging device 400 charges the battery A and the battery B through the switching transistors FET41, FET42. When the battery A is charged, the transistor FET41 is turned on and the current path to the battery A is closed. At this time, since the transistor FET42 is in the off state, all current from the constant current circuit is used for charging the battery A.

The transistors FET43, FET44 are in the off state by the applied voltage from the DC-IN, and the internal parasitic diodes in the transistors FET43, FET44 are in the reverse bias state to the DC-IN. Therefore, the charging current to the battery A does not leak to the DC to DC converter 402. In the same way, the charging current to the battery A also does not flow to the battery B.

In the fifth embodiment, the switching circuit for the discharging is removed as compared to the conventional device. Further, there is a difference in the control method of the charging and the discharging between the embodiment and the conventional device.

In the conventional device, the charging device is fixedly connected to the battery to be charged from start of the charging to the end, and the charging current continues to flow into the battery. On the contrary, in this embodiment, the charging device 400 is time-divisionally connected to the plurality of batteries from the start of the charging to the end of the charging, and the charging current intermittently flows to each battery. Therefore, each battery is charged in a pulse.

In the method of charging the battery, there is a method of continuous charging by continuously flowing current to the battery, and a method of intermittent charging by pulse flow of the current to the battery, which is referred to as pulse charging. In pulse charging, after the current flows to the battery for a given time interval, a pause cycle is given. The charging cycle and the pause cycle are alternately repeated to charge the battery.

As mentioned above, in the pulse charging method, after the current is flowed to the battery for the given time interval, the pause cycle is given. Further, during the pause cycle, the charging current flows to other battery, and, thus, the plural batteries may be simultaneously charged.

The other purpose in the embodiment is to increase the operational time of the apparatus and to increase the current which can be instantaneously discharged. In the embodiment, the plurality of secondary batteries can be charged in parallel in the single constant current circuit.

To individually manage the charging current for the plural batteries in the single constant current circuit, the switching circuits (transistors FET41, FET42) for turning on and off the path between the constant current circuit and the secondary batteries is provided. Further, to prevent both switching circuits from turning on, the switching control means 460 is provided, which switches the switching circuits automatically at the given time interval such that only one of the secondary batteries is connected to the charging device at a given time.

In the above-mentioned configuration, since the switching circuits are time-divisionally switched, the plurality of secondary batteries may be time-divisionally charged. And, since the charging currents for the plural batteries are individually managed, the plurality of secondary batteries may be charged in parallel.

Figure 18A:
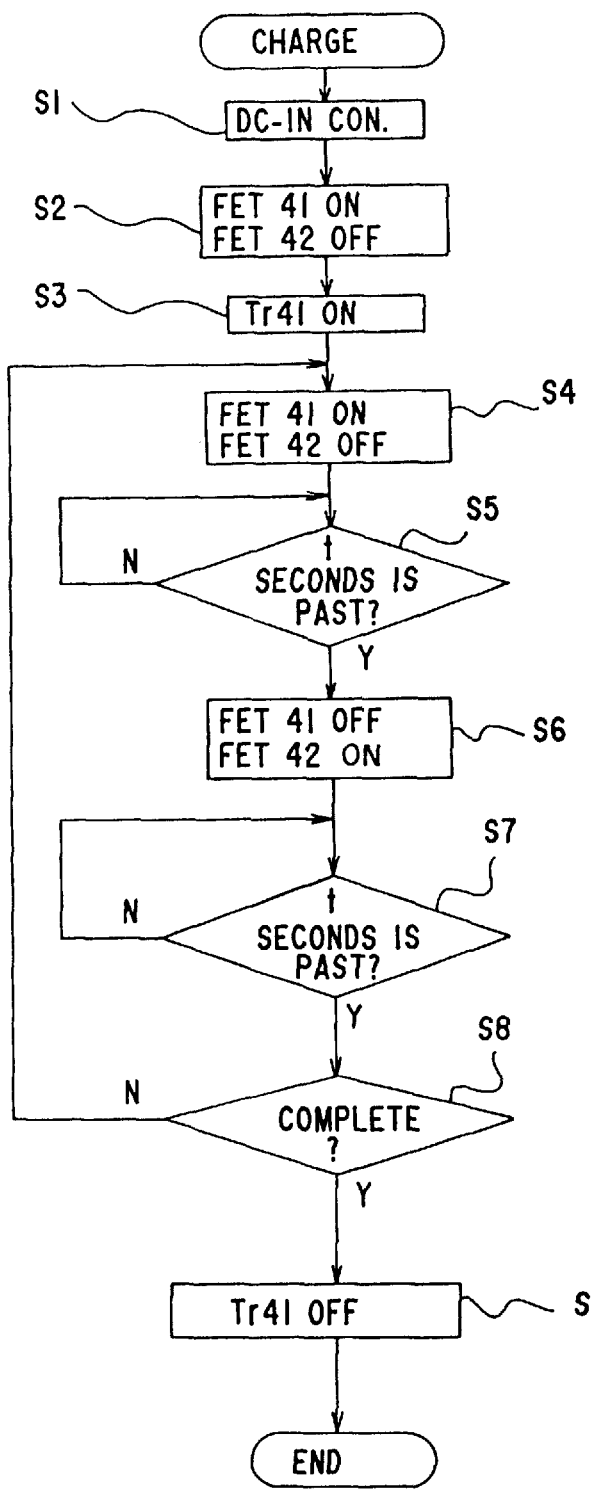
FIG. 18A shows a charging flowchart in a control section and a charge control section shown in FIG. 17.
Figure 18B:
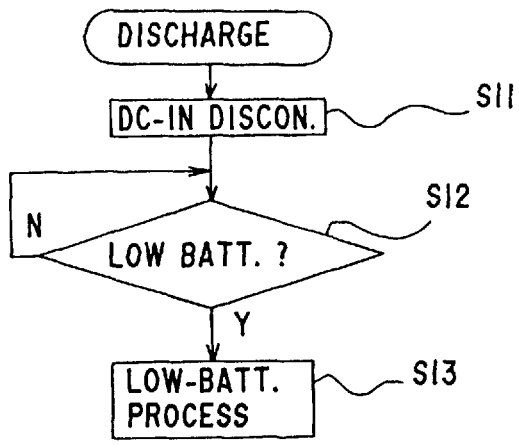
FIG. 18B shows a discharging flowchart in the control section and the charging control section shown in FIG. 17.

FIG. 18A shows a charging flowchart in the control section 403 and the charge control section 450 shown in FIG. 17. FIG. 18B shows a discharging flowchart in the control section 403 and the charging control section 450 shown in FIG. 17.

In the charging process shown in FIG. 18A, when external power is supplied to DC-IN, the transistors FET43, FET44 are turned off by the resistor R45 (S1). When it is detected that external power is supplied to the DC-IN, it proceeds to the following process. First, the transistor FET41 is turned on, and the transistor FET42 is turned off (S2). Next, the transistor Tr41 is turned on (S3).

After that, the transistor FET41 is turned on, and the transistor FET42 is turned off to charge the battery A (S4). In a step S5, once an interval of t seconds past is detected, the transistor FET41 is turned off, and the transistor FET42 is turned on to charge the battery B (S6). Also, in this case, in step S7, after waiting for the interval of t seconds to pass, the steps S4 to S7 are repeated until the completion of the charging is detected by decision in step S8. When the charging is completed, the transistor FET41 is turned off to stop the charging control.

In the discharging process shown in FIG. 18B, in a step S11, when the external power supply to the DC-IN is stopped, the transistors FET43, FET44 are automatically turned on by the resistor R45. The battery A and the battery B simultaneously switch to the discharging state. Therefore, in step S12, when a low battery (Low Batt) signal is detected, both batteries are fully discharged. In this case, the low battery process is started in step S13.

In the above charging process, even if the process is stopped at any time, charged levels of both of the battery A and the battery B are the same. Therefore, when both batteries are simultaneously discharged, the current flow between the battery A and the battery B does not occur. This device is characterized in that during both charging and discharging, the levels of both batteries change in the same manner.

In the above control flow, the interval of t seconds for the switching time interval is preferably a short time interval, for example, several seconds. When the time interval for switching is selected to a longer time, a difference in the charging level between both batteries may be undesirably caused. The switching control means 460 in the charge control section 450 may be provided with, for example, a software control by using a microcomputer.

Figure 19:
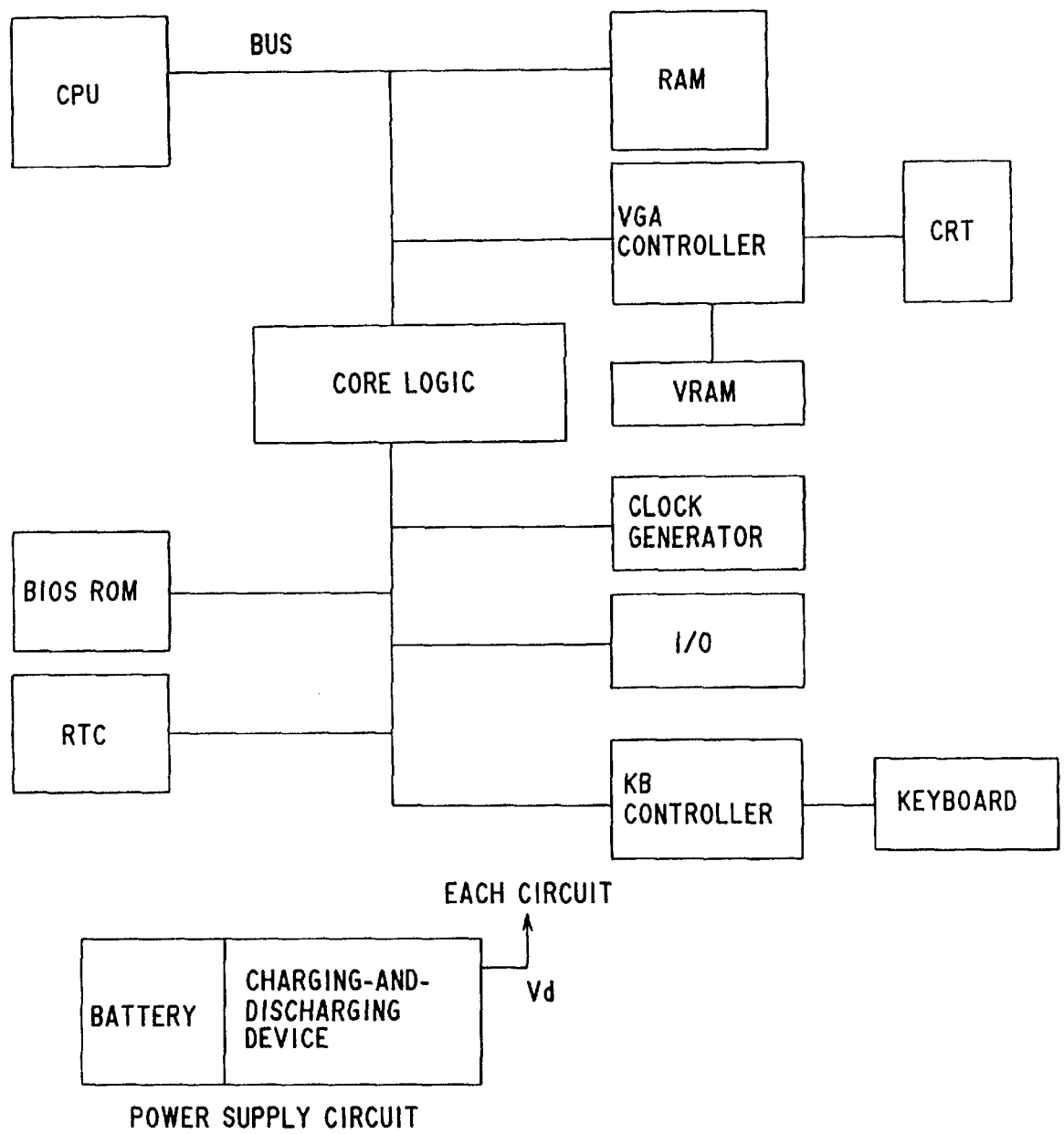
FIG. 19 shows a block diagram of a battery-driven portable computer including the charging-and-discharging device according to the present invention.

FIG. 19 shows a block diagram of a battery-driven portable computer including the charging-and-discharging device according to the present invention. The portable computer comprises a CPU, RAMs, core logic, a CRT, a keyboard, and a clock generator. The portable computer further includes a power supply circuit with the battery including the above-mentioned charging-and-discharging device. The charging-and-discharging device may be any of the above-described embodiments.

The power supply apparatus comprises the charging device and the power consuming device such as a DC to DC converter.

More specifically, the battery may be the battery pack including the secondary battery, the over-discharging prevention switching circuit, and the control section for controlling the switching circuit, which is a portion of the charging-and-discharging control device. In this case, the battery pack further has the positive, negative and discharge control terminals.

Further, the present invention is not limited to these embodiments, but various variations and modifications may be made without departing from the scope of the present invention.

What is claimed is:

1. A charging-and-discharging device in an electronic apparatus including a charging device having a charging circuit for charging a plurality of rechargeable batteries, said charging-and-discharging device comprising:

a plurality of switching circuits turning on and off paths between said charging circuit and said batteries;

switching control means for alternately switching said plurality of switching circuits at a given time interval such that said charging circuit of the charging device is connected to only one of the batteries during charging;

wherein said switching circuit is time-divisionally switched such that the plurality of batteries are time-divisionally charged, and wherein the batteries are connected in parallel to power consuming circuits, in a discharging state.

2. The charging-and discharging device as claimed in claim 1, wherein said plurality of batteries are connected in parallel to the power-consuming circuits by transistors which are switched off when external power is supplied to the circuit, and switched on when the external power is no longer supplied.

3. An electronic apparatus according to claim 2, wherein said transistors comprise P-type DMOS-FET's having internal protection diodes, said transistors being configured such that said internal protection diodes allow current flow from said batteries to the power consuming circuits, and prohibit external power supplied to the power consuming circuits to flow in an opposite direction through the batteries.

4. An electronic apparatus operating with a battery comprising:

a charging-and-discharging device charging a plurality of rechargeable batteries and supplying power of the battery to said electronic apparatus, said charging-and-discharging device including:

a charging device having a charging circuit for charging the batteries;

a plurality of switching circuits for turning on and off paths between said charging circuit and said batteries;

switching control means for alternately switching said plurality of switching circuits at a given time interval such that said charging circuit of the charging device is connected to only one of the batteries during charging;

wherein said switching circuit is time-divisionally switched such that the plurality of batteries are time-divisionally charged; and power consuming circuits provided with said power of the batteries from the charging-and-discharging device, said batteries being connected to said power consuming circuits in parallel, in a discharging state.

* * * * *